US008687227B2

(12) United States Patent  
Sakurai et al.

(10) Patent No.: US 8,687,227 B2  
(45) Date of Patent: *Apr. 1, 2014

(54) PRINTING INDEX IMAGES AND FILE INFORMATION TOGETHER

(71) Applicants: Kunihiko Sakurai, Gifu (JP); Norio Mizutani, Mie (JP); Sadaaki Miyazaki, Nagoya (JP)

(72) Inventors: Kunihiko Sakurai, Gifu (JP); Norio Mizutani, Mie (JP); Sadaaki Miyazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,977

(22) Filed: Jun. 30, 2013

(65) Prior Publication Data

US 2013/0293906 A1 Nov. 7, 2013

Related U.S. Application Data

(63) Continuation of application No. 13/731,043, filed on Dec. 30, 2012, now Pat. No. 8,508,788, which is a continuation of application No. 11/776,545, filed on Jul. 11, 2007, now Pat. No. 8,368,944.

(30) Foreign Application Priority Data

| Jul. 12, 2006 | (JP) | 2006-191561 |
| Jul. 18, 2006 | (JP) | 2006-195005 |
| Jul. 18, 2006 | (JP) | 2006-195006 |

(51) Int. Cl.  
*G06K 15/00* (2006.01)

(52) U.S. Cl.  
USPC .................................................. 358/1.18

(58) Field of Classification Search  
USPC ............................................. 358/1.12, 1.18  
See application file for complete search history.

(56) References Cited

U.S. PATENT DOCUMENTS

| 4,889,439 A | 12/1989 | Cook et al. |
| 5,892,889 A | 4/1999 | Nishijima |

(Continued)

FOREIGN PATENT DOCUMENTS

| JP | H11-321009 A | 11/1999 |
| JP | 2000-332985 A | 11/2000 |

(Continued)

OTHER PUBLICATIONS

Creating Glass Buttons in MSPaint, retrieved from http://www.nerdparadise.com/tech/apps/mspaint/glassbuttons/ on Aug. 17, 2013.*

(Continued)

*Primary Examiner* — Eric A Rust  
(74) *Attorney, Agent, or Firm* — Baker Botts L.L.P.

(57) ABSTRACT

An image forming apparatus is provided with a data retrieving unit that retrieves index image data and associating file information corresponding files from a recording medium. The index image data and associating tile information are allocated to a plurality of arrangement sections. The index image data and associating file information may be printed on a printing sheet in accordance with a predetermined layout. A judging unit is provided to judge whether the associating file information is less than or equal to a predetermined length, The associating file information which is longer than the predetermined length is normally printed incompletely so as to he printed within the arrangement section. A layout modifying unit is provided to modify the predetermined layout for the arrangement section if the associating file information is longer than the predetermined length so that the associating file information is printed completely on the printing sheet.

11 Claims, 17 Drawing Sheets

(56) References Cited

U.S. PATENT DOCUMENTS

| | | |
|---|---|---|
| 6,266,641 B1 | 7/2001 | Takaya |
| 6,330,051 B1 | 12/2001 | Takanashi |
| 6,469,770 B2 | 10/2002 | Hoshino et al. |
| 6,774,980 B2 | 8/2004 | Hoshino et al. |
| 2003/0181199 A1 | 9/2003 | Yamaguchi et al. |
| 2005/0270579 A1 | 12/2005 | Hibi et al. |
| 2006/0015804 A1 | 1/2006 | Barton et al. |
| 2007/0201053 A1 | 8/2007 | Sellers et al. |

FOREIGN PATENT DOCUMENTS

| | | |
|---|---|---|
| JP | 2000-338608 A | 12/2000 |
| JP | 2001-111928 A | 4/2001 |
| JP | 2003-281029 A | 10/2003 |
| JP | 2003-316630 A | 11/2003 |
| JP | 2004-255729 A | 9/2004 |
| JP | 2004-312124 A | 11/2004 |
| JP | 2005-349822 A | 12/2005 |

OTHER PUBLICATIONS

MS Paint 2000.*

Machine translation of JP 2000-332985 to Kaneko.*

Japan Patent Office, Notification of Reasons of Rejection for Japanese Patent Application No. 2006-191561 (counterpart to U.S. Patent No. 8,368,944 B2), dispatched Aug. 5, 2008.

* cited by examiner

| | 54 | 51 55 | 52 56 | 53 |
|---|---|---|---|---|
| ARRANGEMENT SECTION NUMBER | 1 | 2 | 3 | |
| ARRANGEMENT FILE | 0 | 0 | 0 | |
| ARRANGEMENT SECTION NUMBER | 4 | 5 | 6 | |
| ARRANGEMENT FILE | 0 | 0 | 0 | |
| ARRANGEMENT SECTION NUMBER | 7 | 8 | 9 | |
| ARRANGEMENT FILE | 0 | 0 | 0 | |
| ARRANGEMENT SECTION NUMBER | 10 | 11 | 12 | |
| ARRANGEMENT FILE | 0 | 0 | 0 | |
| | 60 57 | 61 58 | 62 59 | |

0 : NOT YET ALLOCATED    1 : ALLOCATED    2 : NOT ALLOCATABLE

FIG.16

| | 54 | 51 55 | 52 56 | 53 |
|---|---|---|---|---|
| ARRANGEMENT SECTION NUMBER | 1 | 2 | 3 | |
| ARRANGEMENT FILE | 1 | 0 | 0 | |
| ARRANGEMENT SECTION NUMBER | 4 | 5 | 6 | |
| ARRANGEMENT FILE | 0 | 0 | 0 | |
| ARRANGEMENT SECTION NUMBER | 7 | 8 | 9 | |
| ARRANGEMENT FILE | 0 | 0 | 0 | |
| ARRANGEMENT SECTION NUMBER | 10 | 11 | 12 | |
| ARRANGEMENT FILE | 0 | 0 | 0 | |
| | 60 57 | 61 58 | 62 59 | |

0 : NOT YET ALLOCATED    1 : ALLOCATED    2 : NOT ALLOCATABLE

FIG.17

| ARRANGEMENT SECTION NUMBER | 1 | 2 | 3 |
|---|---|---|---|
| ARRANGEMENT FILE | 1 | 1 | 0 |
| ARRANGEMENT SECTION NUMBER | 4 | 5 | 6 |
| ARRANGEMENT FILE | 0 | 2 | 0 |
| ARRANGEMENT SECTION NUMBER | 7 | 8 | 9 |
| ARRANGEMENT FILE | 0 | 0 | 0 |
| ARRANGEMENT SECTION NUMBER | 10 | 11 | 12 |
| ARRANGEMENT FILE | 0 | 0 | 0 |

0 : NOT YET ALLOCATED   1 : ALLOCATED   2 : NOT ALLOCATABLE

FIG.18

| ARRANGEMENT SECTION NUMBER | 1 | 2 | 3 |
|---|---|---|---|
| ARRANGEMENT FILE | 1 | 1 | 1 |
| ARRANGEMENT SECTION NUMBER | 4 | 5 | 6 |
| ARRANGEMENT FILE | 1 | 2 | 1 |
| ARRANGEMENT SECTION NUMBER | 7 | 8 | 9 |
| ARRANGEMENT FILE | 2 | 1 | 1 |
| ARRANGEMENT SECTION NUMBER | 10 | 11 | 12 |
| ARRANGEMENT FILE | 1 | 0 | 2 |

0 : NOT YET ALLOCATED   1 : ALLOCATED   2 : NOT ALLOCATABLE

FIG.19

PRINTING INDEX IMAGES AND FILE INFORMATION TOGETHER

CROSS-REFERENCE TO RELATED APPLICATIONS

This application is a continuation application of U.S. patent application Ser. No. 13/731,043 filed on Dec. 30, 2012, which is a continuation application of U.S. patent application Ser. No. 11/776,545 filed on Jul. 11, 2007, now U.S. Pat. No. 8,368,944 B2 issued on Feb. 5, 2013, which claims priority from Japanese Patent Applications No. 2006-191561filed on Jul. 12, 2006, No. 2006-195005 filed on Jul. 18, 2006, and No. 2006-195006 filed on Jul. 18, 2006, the disclosures of which are incorporated herein by reference.

BACKGROUND

1. Technical Field

The present invention relates to an image forming apparatus having a function of printing index images and associating file information corresponding to a plurality of files.

2. Related Art

Conventionally, image forming apparatuses having a function of printing index images have been known. An example of the index image printing function is disclosed in Japanese Patent Provisional Publication No. P2000-332985A (hereinafter, referred to as '985 publication). According to a method of printing the index images disclosed in '985 publication, a plurality of image data files stored in the same folder are selected, and then, setting of a size of one index image, setting of attribution printing information, and setting of fonts and printer, if necessary, are made. Then, the selected images are converted to index images, arranged in accordance with a predetermined layout automatically, and printed together with the attribution (associating) information. The attribution information may include a file name, title of the image data, and file update date/time for each image data file. Therefore, according to the index printing described in '985 publication, there is not necessary for a user to perform a relatively complicated process of setting a layout of the index images and/or the attribution printing information.

In some cases, however, the user need to refer to a file name to identify a desired file from among a plurality of files of which index images are arranged on one sheet. For example, when an index image is created based on a first page of a text document, only a train of dots corresponding to a text may be shown on the index image and the user may not be able to distinguish between such images. In another example, when revised versions of a certain document, such as a report, are made, the first page thereof may be unchanged and only part of its contents are revised. In such a case, the index images created based on the first page of such revised versions of the same report would be the same, and, typically, the file names differentiated by adding a revision number at the end of the file name. As above, if the user cannot identify the desired file from the index images, the user may refer to the file names.

However, according to the conventional image forming apparatus employing the index image printing method, as disclosed in '985 publication, if the file name is relatively long, the entire file name cannot be printed on a printing sheet when the index image is printed. In such a case, the user cannot identify a desired file based on the file name, and has to print each document itself to check the contents thereof.

SUMMARY OF THE INVENTION

The present invention is advantageous in that an improved image forming apparatus is provided, which apparatus is free from the deficiencies described above and enables a user to identify a desired file from the index images.

According to aspects of the invention, there is provided an image forming apparatus, which is provided with a data retrieving unit that retrieves a plurality of pieces of index image data and associating file information respectively corresponding to a plurality of files from a recording medium, a data allocating unit that allocates the plurality of pieces of index image data and associating file information to a plurality of arrangement sections, respectively, a printing unit that prints out the plurality of pieces of index image data and associating file information on a printing sheet in accordance with a predetermined layout of the plurality of arrangement sections, a judging unit that judges whether each of the plurality of pieces of the associating file information is less than or equal to a predetermined length. The associating file information which is less than or equal to the predetermined length may be printed completely within the arrangement section while the associating file information which is longer than the predetermined length may be printed incompletely within the arrangement section. A layout modifying unit is further provided, which modifies the predetermined layout of the plurality of arrangement sections if the judging unit determines that at least one of the plurality of pieces of the associating file information is longer than the predetermined length so that the associating file information longer than the predetermined length can be printed on the printing sheet completely.

Optionally the layout modifying unit may create an auxiliary area, the associating file information longer than the predetermined length is printed in the auxiliary area completely.

Additionally, reference information linking the incompletely printed associating file information with the completely printed associating file information may be printed both in the arrangement section and the auxiliary area.

The layout modifying unit may be configured to expand an arrangement section corresponding to the associating file information which is longer than the predetermined length so that the associating file information is printed completely within the corresponding arrangement section.

Optionally, the predetermined layout includes an arrangement area including the plurality of the arrangement sections. In this case, the layout modifying unit may be configured to define an auxiliary area if the judging unit determines that at least one of the plurality of pieces of the associating file information is longer than the predetermined length, the at least one of the plurality of pieces of the associating file information judged to be longer than the predetermined length being printed entirely within the auxiliary area.

The arrangement sections may be printed in row and column directions in a matrix, and the layout modifying unit may be configured to include a length detecting unit that detects a length of the plurality of file identification information, a selecting unit that selects a predetermined number of pieces of the file identification information, and an allocating system that allocates the file identification information selected by the selecting unit to the arrangement sections arranged on the same row.

Further optionally, the arrangement sections may be printed in row and column directions in a matrix, and the layout modifying unit may be configured to include an indication judging unit that judges whether the entire arrangement information can be indicated within the arrangement section, an expanding unit that expands the arrangement section in one of the row and column directions if the indication judging unit judges that the entire arrangement information cannot be indicated within the arrangement section, and a blank portion defining unit that defines an arrangement section adjacent to the arrangement section expanded by the expanding unit as a blank portion to allow the expansion thereof. The file identification information of which the length exceeds a predetermined length may be indicated in the expanded arrangement section.

According to other aspects of the invention, there is provided a computer usable medium having computer readable instructions stored thereon, which instructions cause a computer to execute an image forming process. The process includes the steps of retrieving a plurality of pieces of index image data and associating file information respectively corresponding to a plurality of files from a recording medium connected to the computer, allocating the plurality of pieces of index image data and associating file information to a plurality of arrangement sections defined in a memory of the computer, respectively, printing the plurality of pieces of index image data and associating file information on a printing sheet in accordance with a predetermined layout of the plurality of arrangement sections, judging whether each of the plurality of pieces of the associating file information is less than or equal to a predetermined length. The associating file information which is less than or equal to the predetermined length may be printed completely within the arrangement section, while the associating file information which is longer than the predetermined length may be printed incompletely within the arrangement section. There is also provided the step of modifying the predetermined layout of the plurality of arrangement sections if at least one of the plurality of pieces of the associating file information is judged to be longer than the predetermined length so that the associating file information longer than the predetermined length can be printed on the printing sheet completely.

BRIEF DESCRIPTION OF THE ACCOMPANYING DRAWINGS

Figure 4:
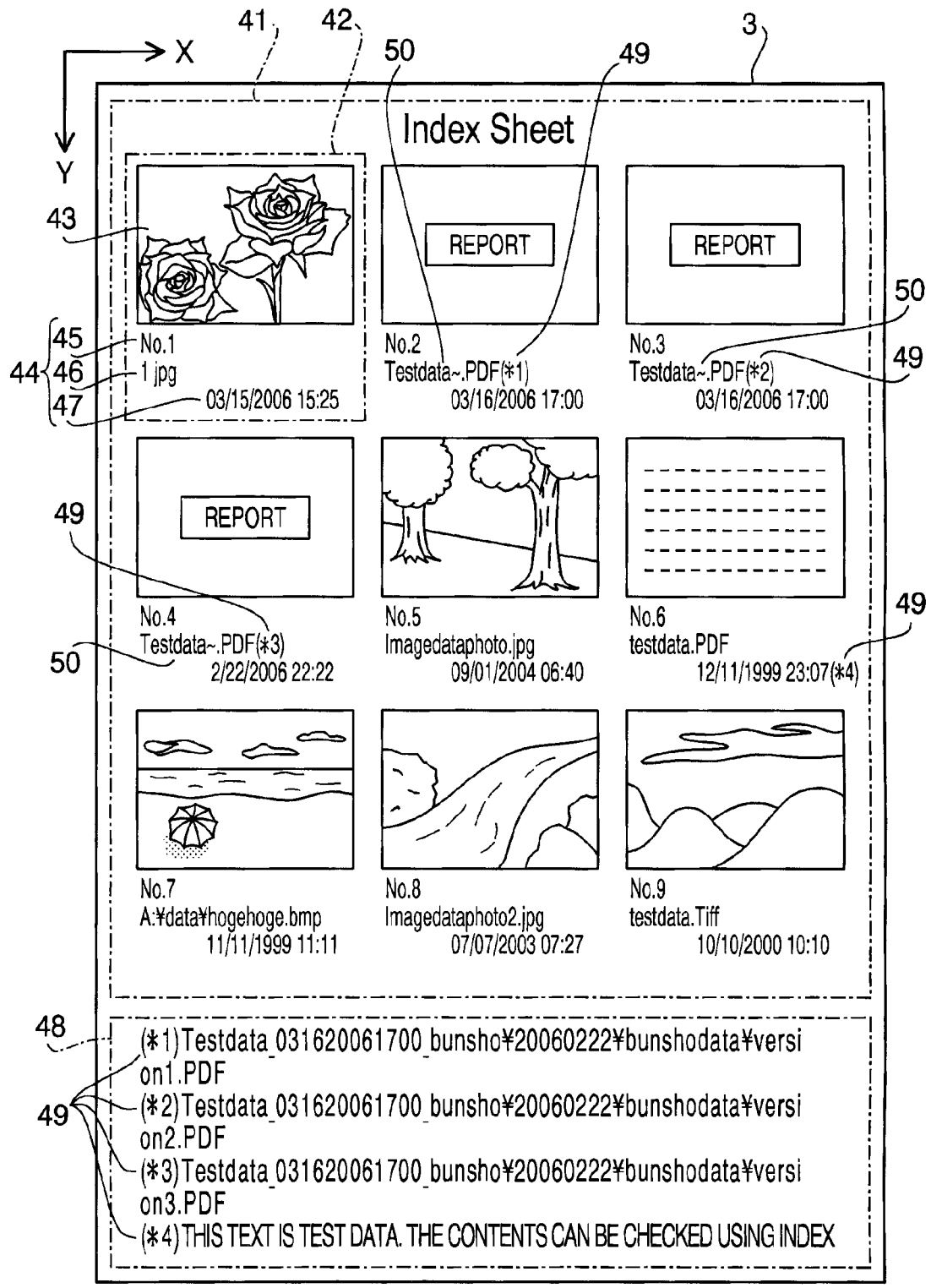

FIG. 4 an example of a printing result when an index image printing process according to the first embodiment is executed.

Figure 5A:
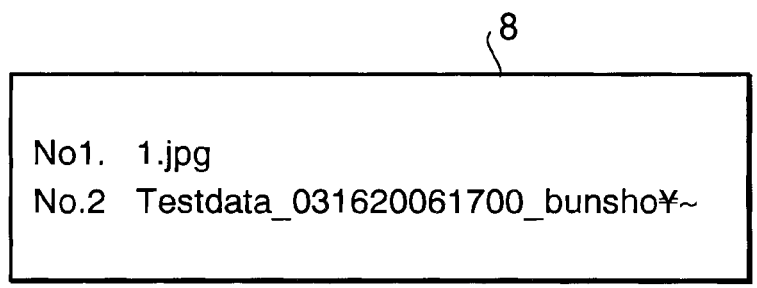
Figure 5B:
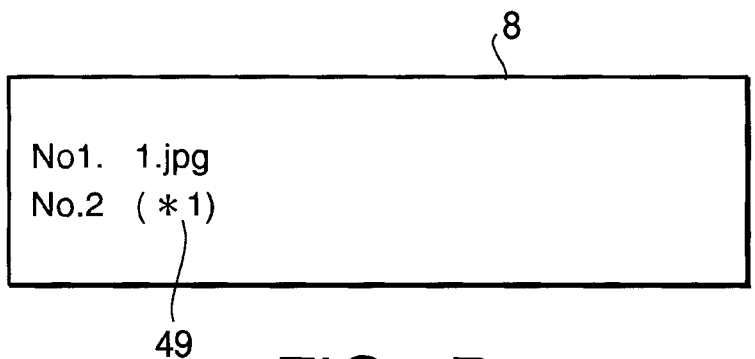

FIGS. 5A and 5B show examples of indications before (FIG. 5A) and after (FIG. 5B) the index image is printed, which indications are displayed when a panel displaying process according to the first embodiment is executed.

Figure 6:
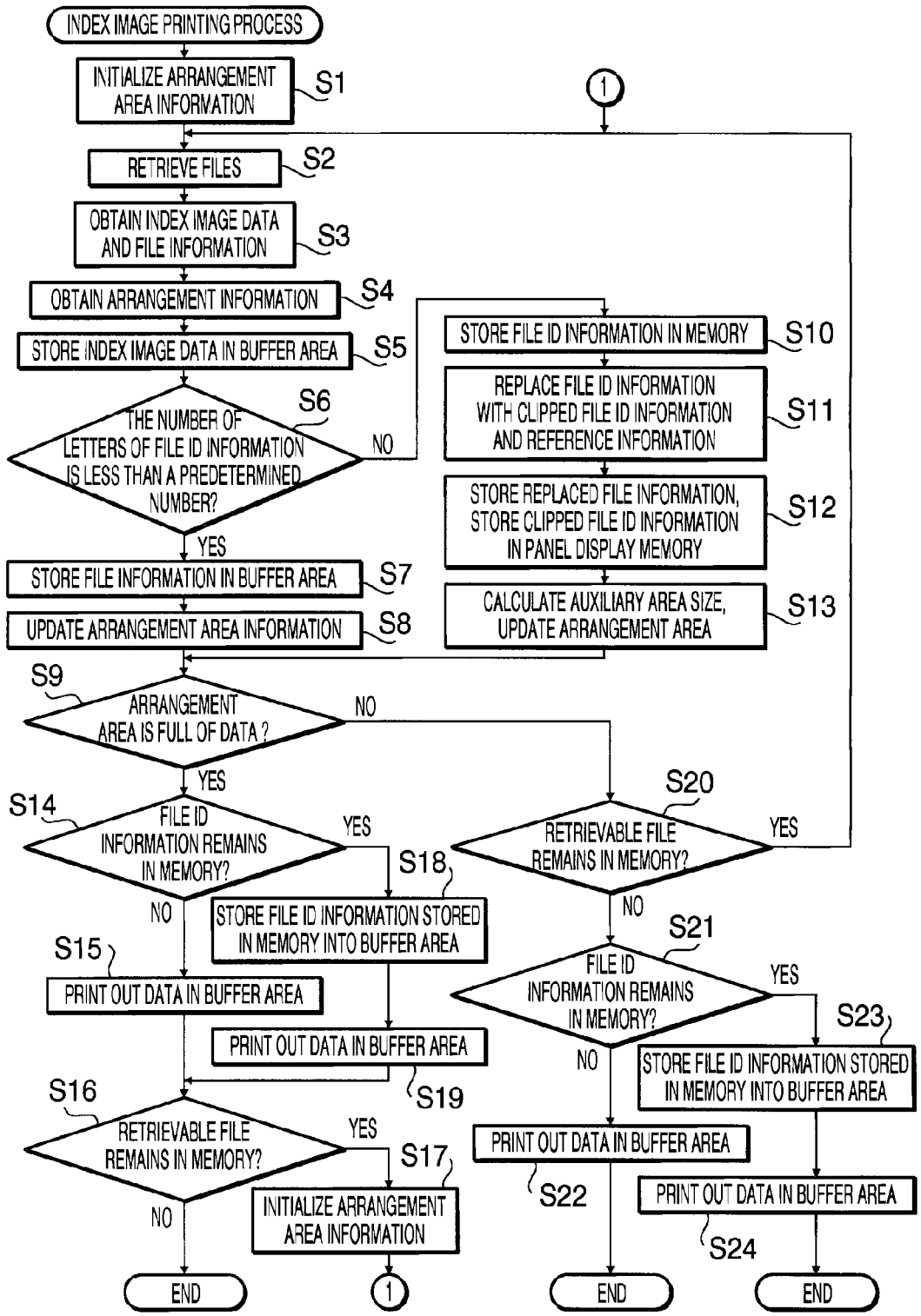

FIG. 6 is a flowchart illustrating the index image printing process according to the first embodiment.

Figure 7:
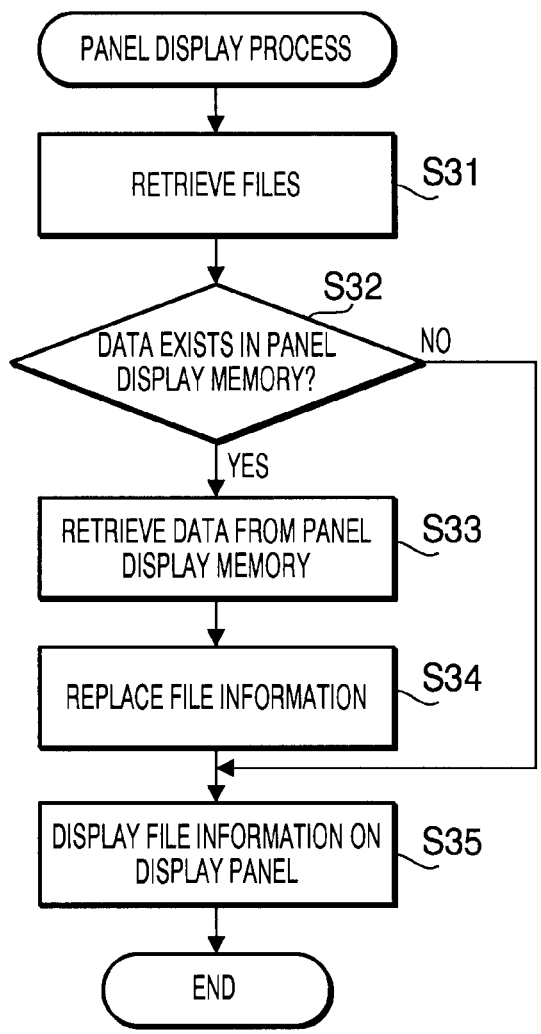

FIG. 7 is a flowchart illustrating the panel displaying process according to the first embodiment.

Figure 8:
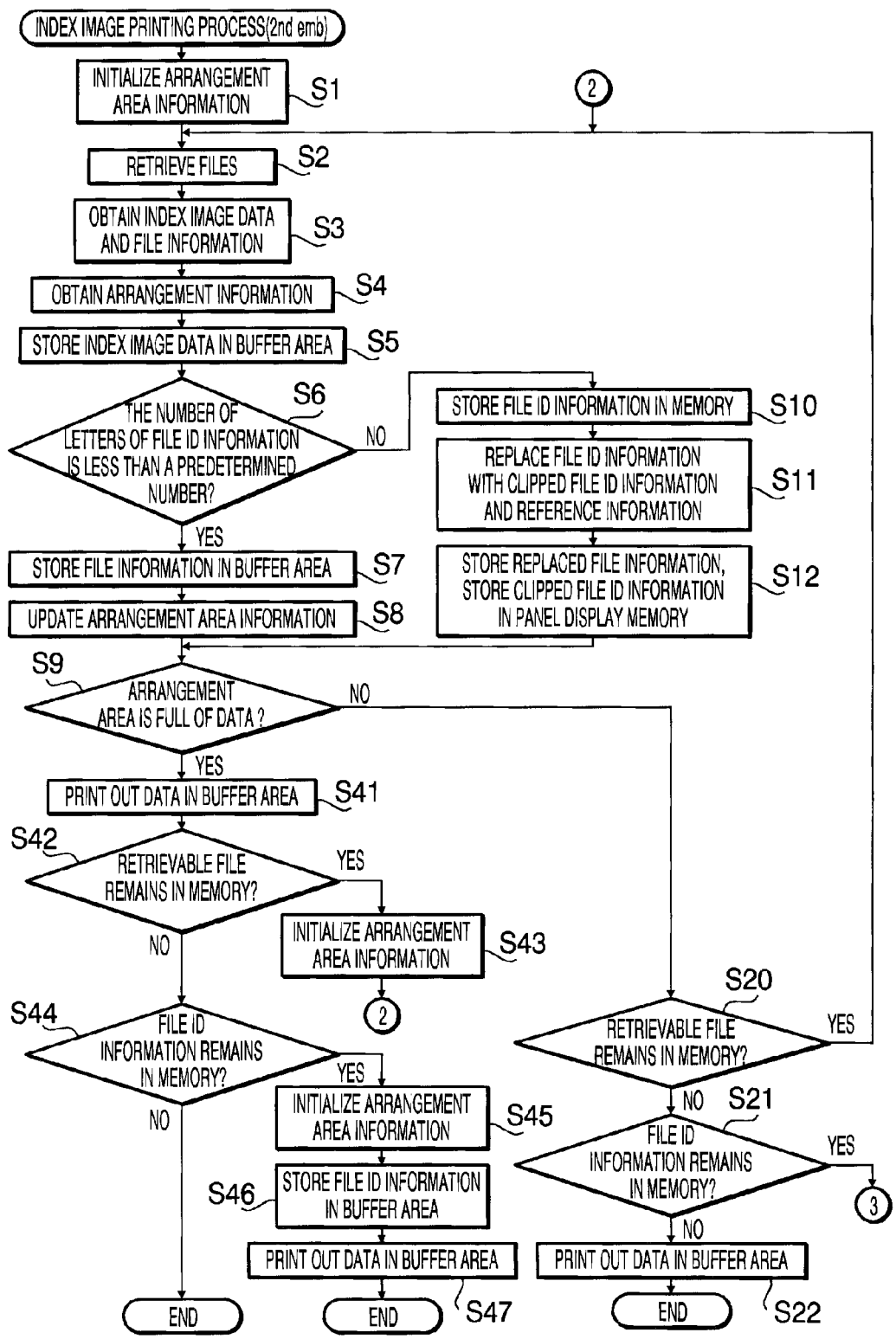
Figure 9:
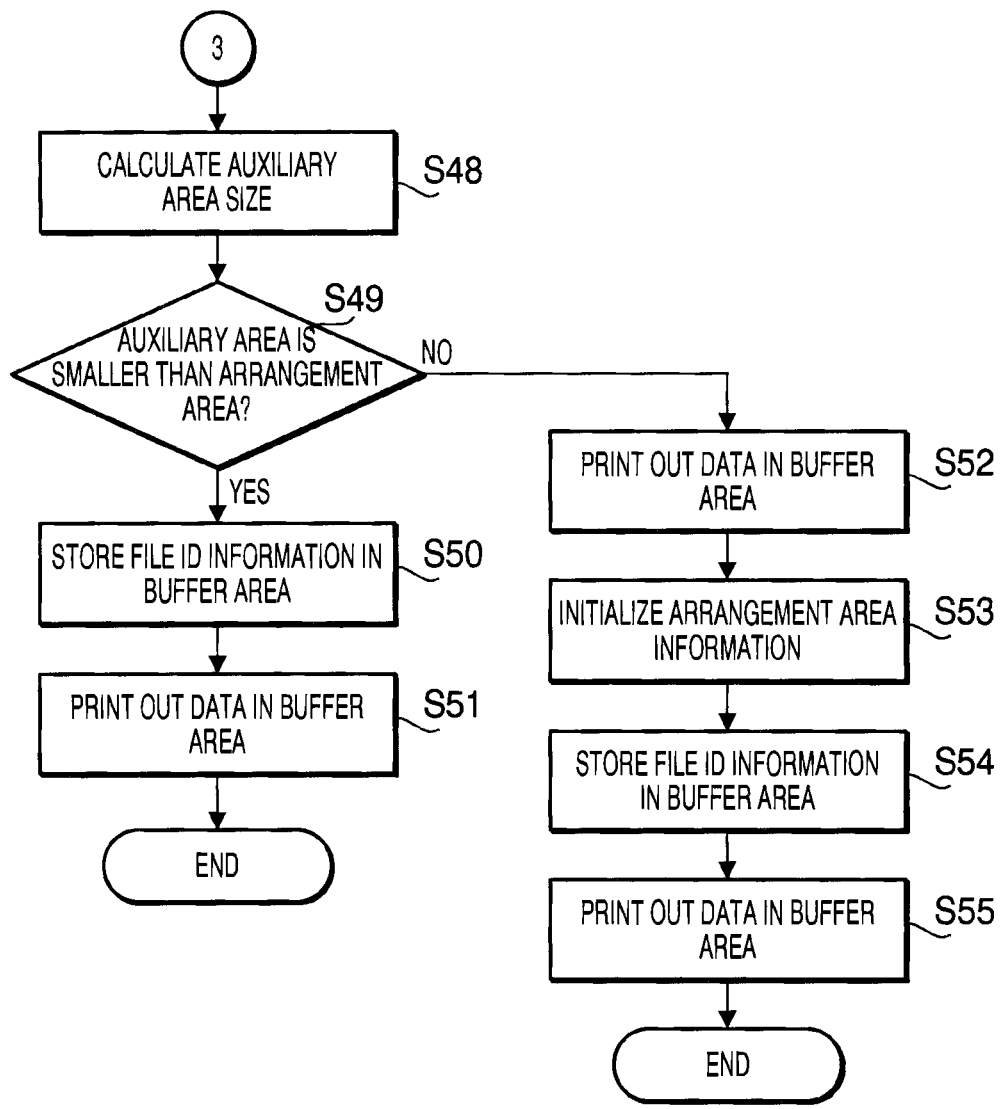

FIG. 8 is a flowchart illustrating, with the flowchart shown in FIG. 9, the index image printing process according to a second embodiment.

FIG. 9 is a flowchart illustrating, with the flowchart shown in FIG. 8, the index image printing process according to the second embodiment.

Figure 1:
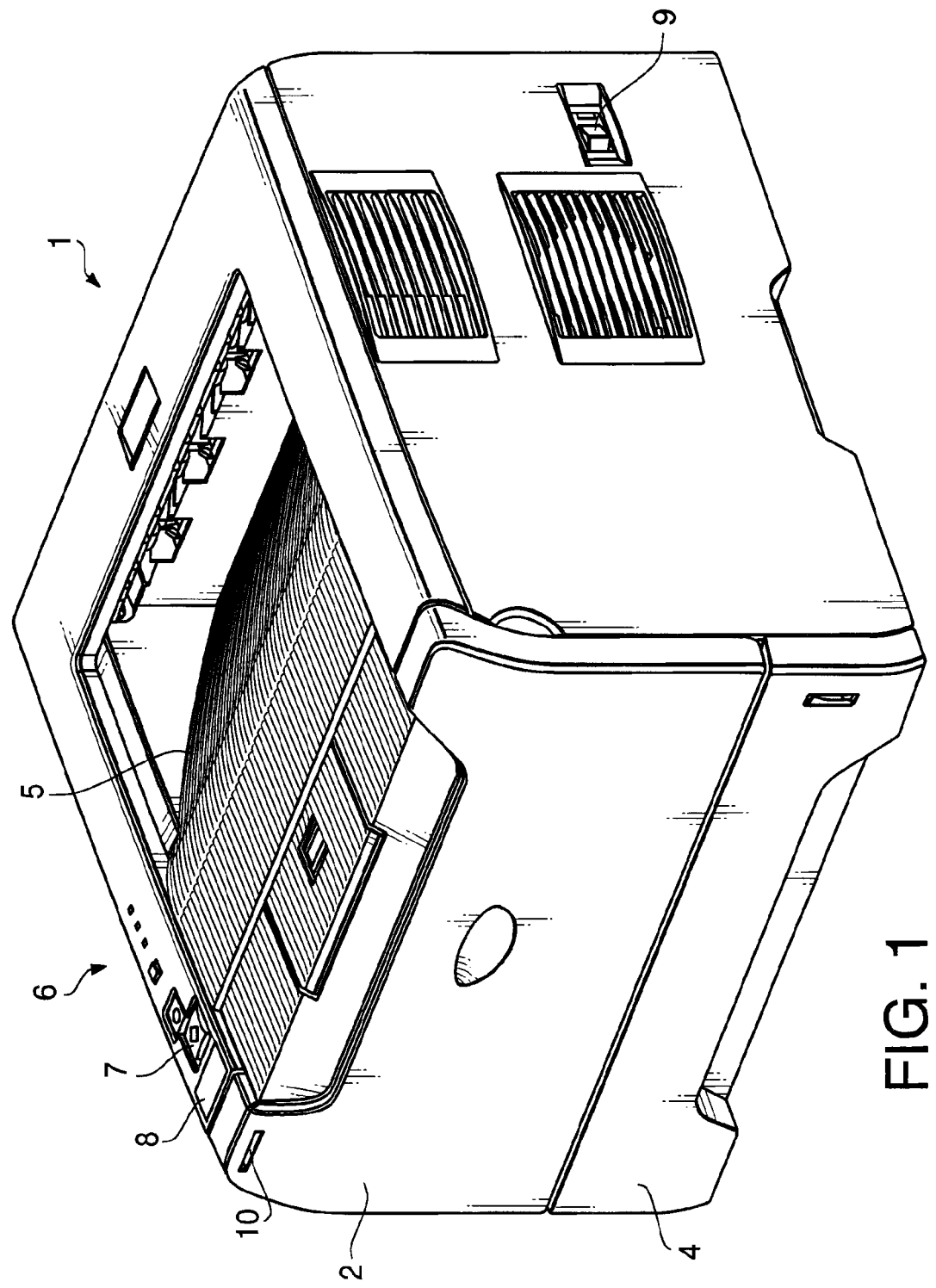
FIG. 1 is a perspective view of a laser printer to which the present invention is applicable.
Figure 10:
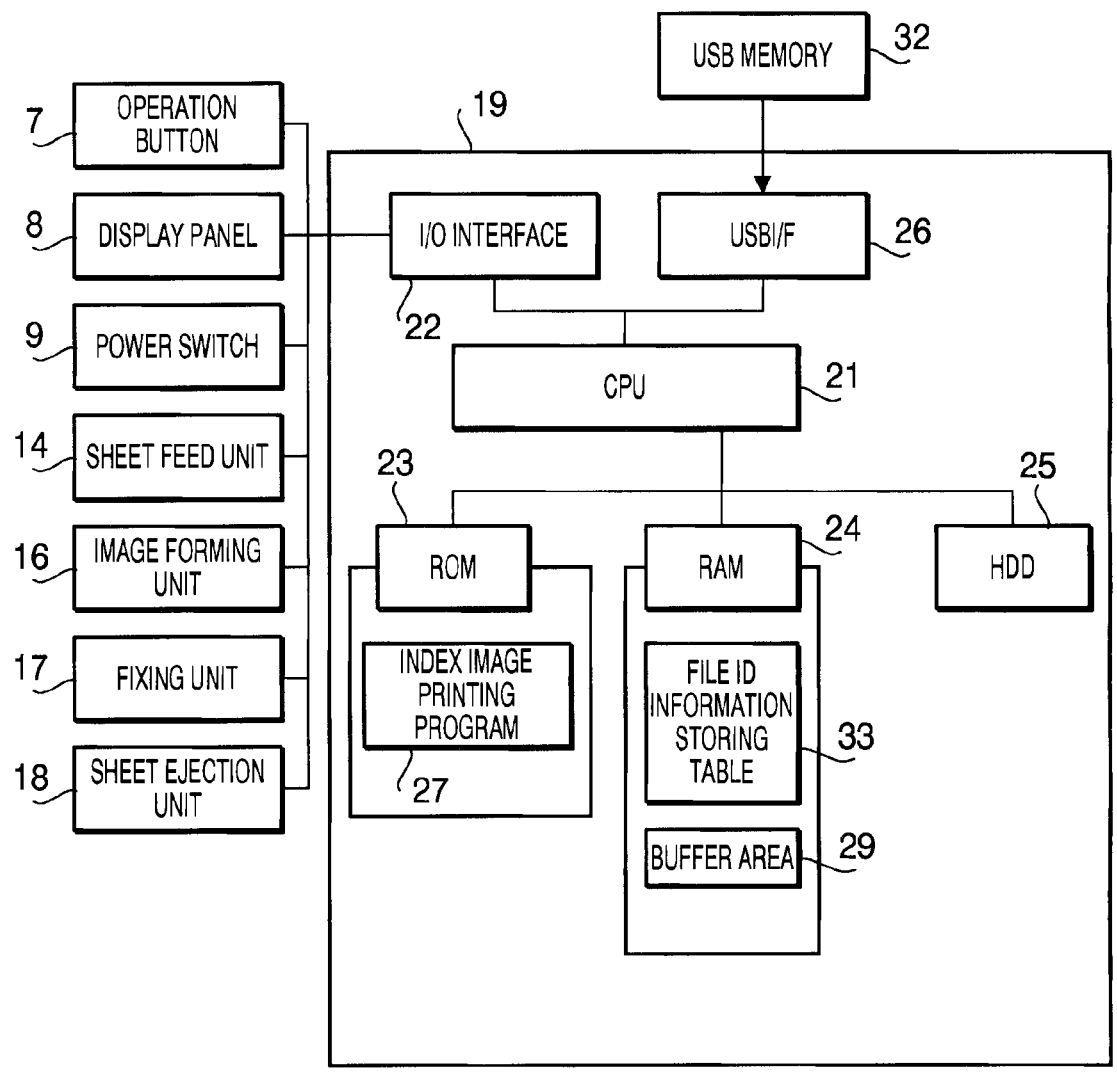

FIG. 10 is a block diagram schematically illustrating a configuration of the controller, which controls operation of the laser printer shown in FIG. 1, according to a second embodiment.

Figure 11:
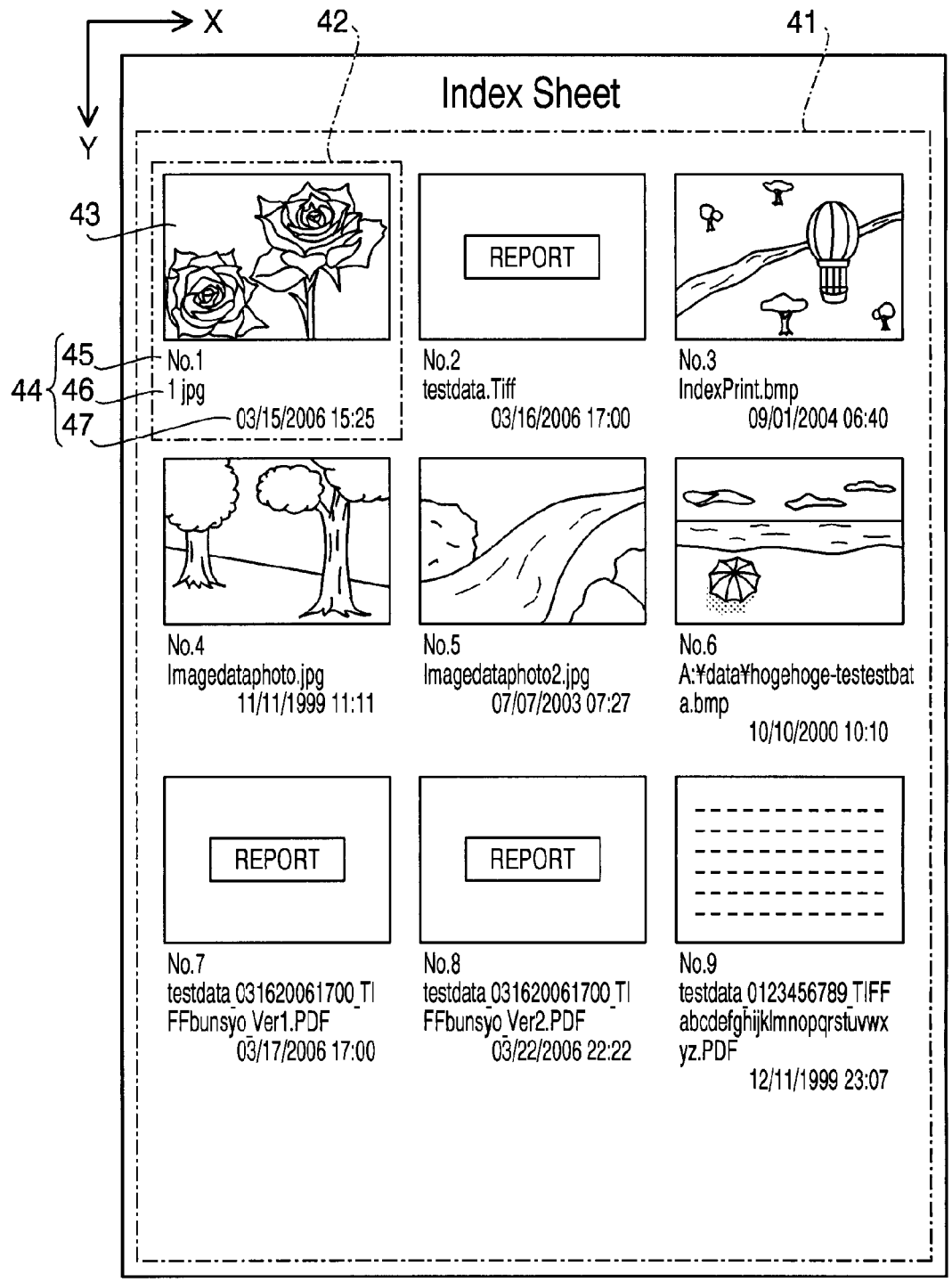

FIG. 11 an example of a printing result when an index image printing process according to the second embodiment is executed.

Figure 12:
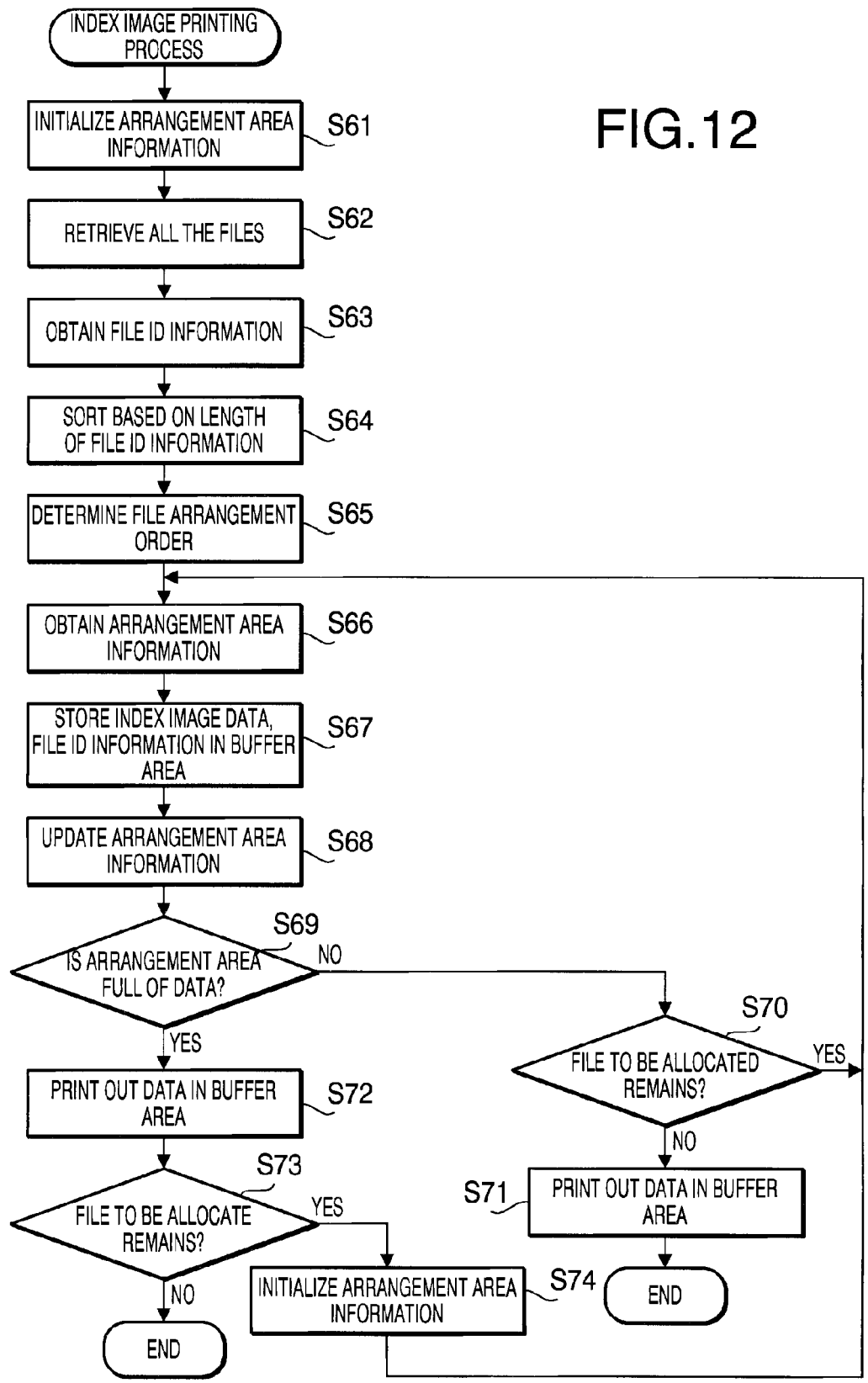

FIG. 12 is a flowchart illustrating the index image printing process according to the second embodiment.

Figure 13:
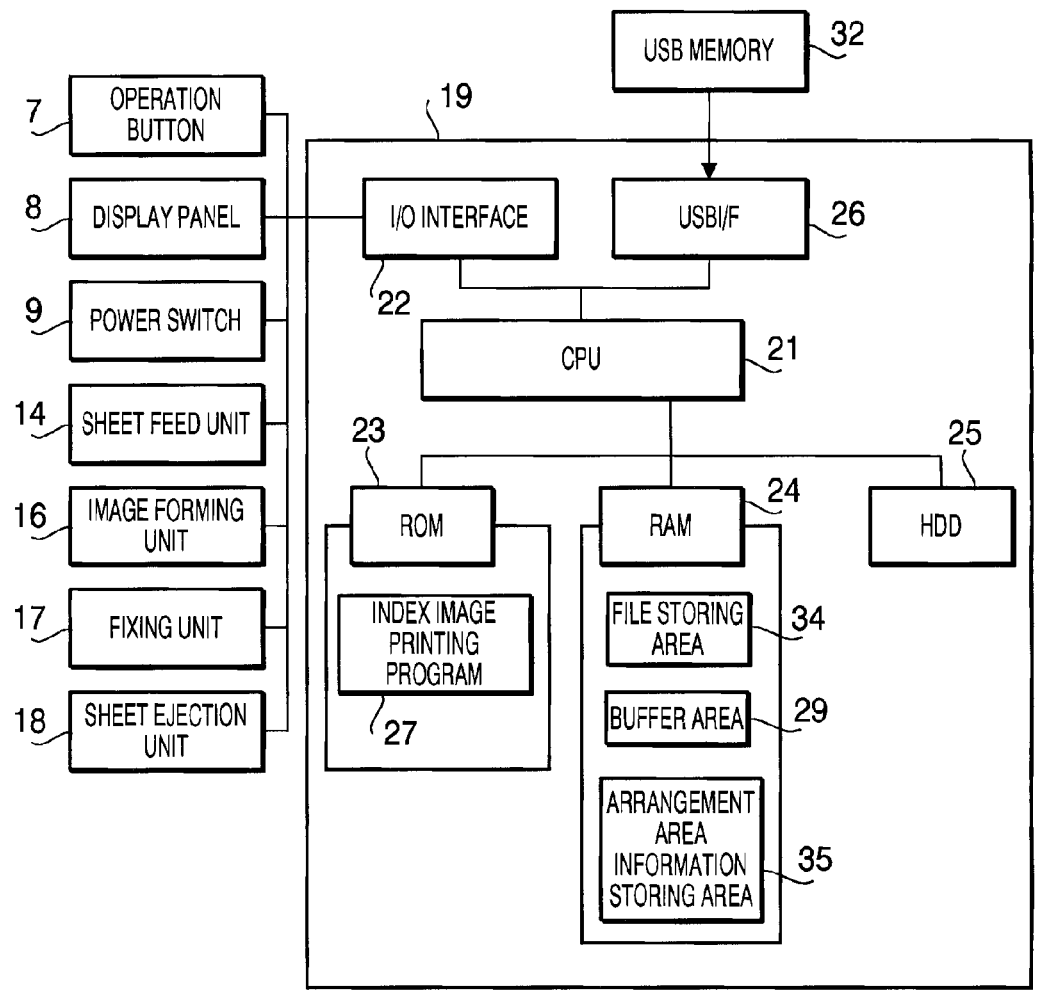

FIG. 13 is a block diagram schematically illustrating a configuration of the controller, which controls operation of the laser printer shown in FIG. 1, according to a third embodiment.

Figure 14:
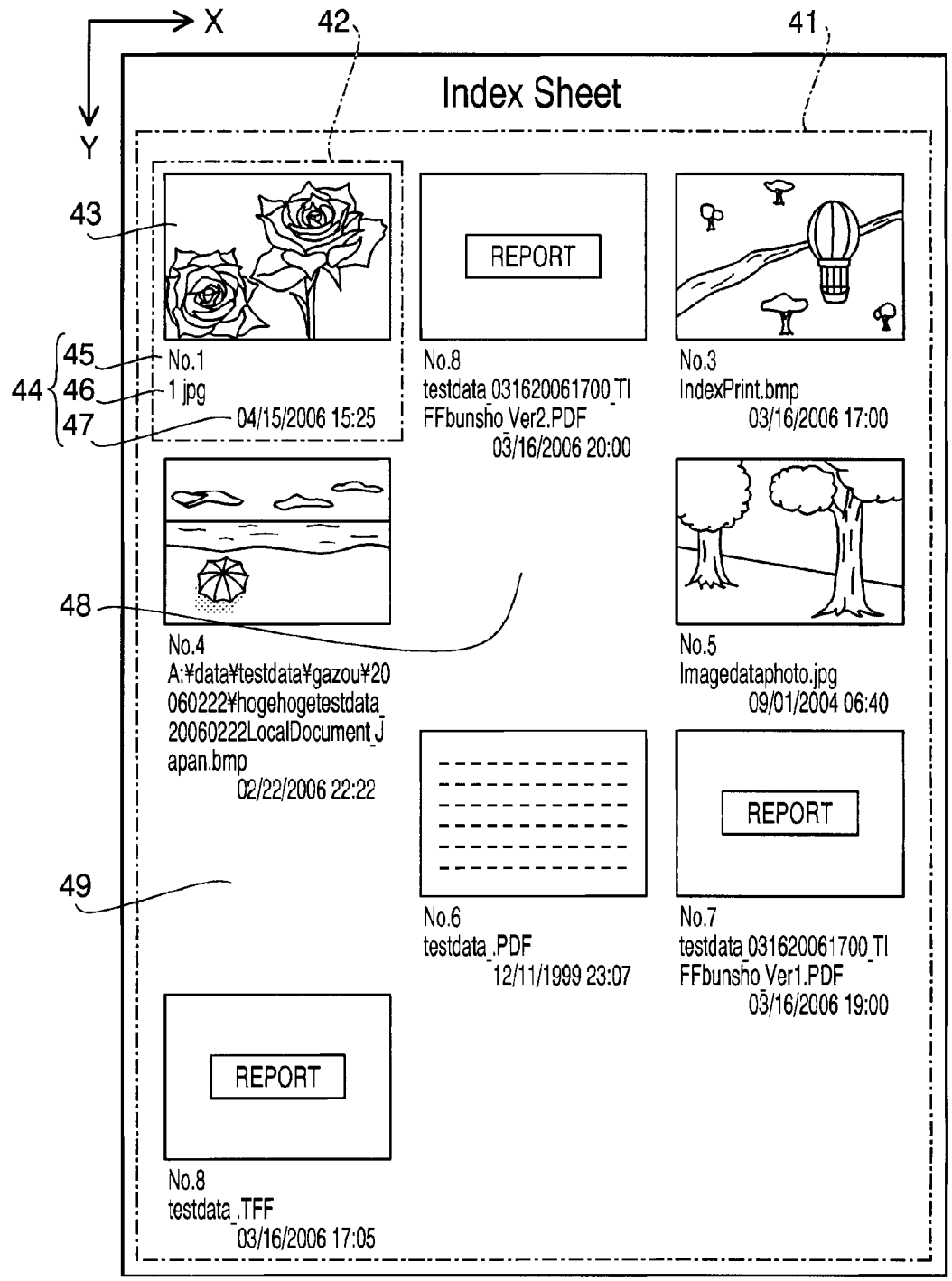

FIG. 14 an example of a printing result when an index image printing process according to the third embodiment is executed.

Figure 15:
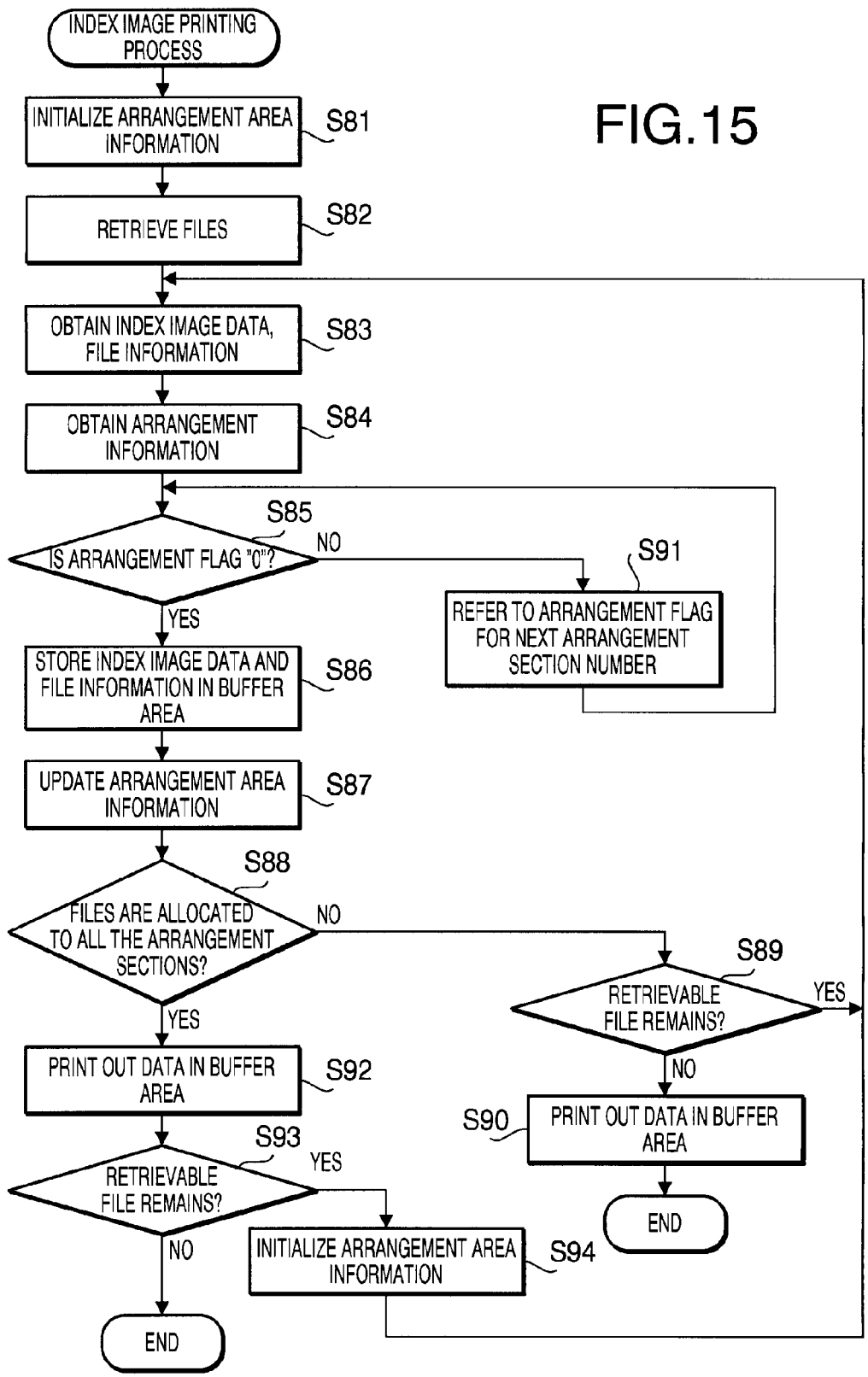

FIG. 15 is a flowchart illustrating the index image printing process according to the third embodiment.

FIG. 16 schematically shows a data structure of arranging area information (in an initial state) stored in a buffer area shown in FIG. 13.

FIG. 17 schematically shows the data structure of arranging area information in a state where arrangement flags for arrangement section has been set.

FIG. 18 schematically shows the data structure of arranging area information in a state where arrangement flags for arrangement section has been set.

FIG. 19 schematically shows the data structure of arranging area information in a state where arrangement flags for all the arrangement sections have been set.

DETAILED DESCRIPTION OF THE EMBODIMENTS

Referring to the accompanying drawings, embodiments according to the present invention will be described in detail.

FIG. 1 is a perspective view of a laser printer 1 to which the present invention can be applied. It should be noted that the laser printer is an example of the image forming apparatus to which the invention is applicable.

The laser printer 1 has a function of printing an index image which is a collection of a plurality of index images and associating file identification information (hereinafter, referred to as file ID information) respectively corresponding to a plurality files. Each of the index images and associating file ID information is arranged within a arrangement section 42 (see FIG. 4) defined on a predetermined arrangement area 41 (see FIG. 4) of the printing sheet 3.

The laser printer 1 has a casing 2. On a lower side of the laser printer 1, a sheet feed cassette 4 is provided for accommodating a stack of printing sheet 3. On an upper surface of the casing 2, a sheet ejection tray 5 is formed. On one side of the sheet ejection tray 5, an operation unit 6 is provided. The operation unit ;6 is for operating the laser printer 1, and includes an operation button 7 for inputting operation commands and a display panel 8 for displaying various data. On one side surface of the casing 2, a power switch 9 for turning ON/OFF the laser printer 1 is provided. On a front surface of the casing 2 (i.e., on the surface from which the sheet feed cassette 4 is withdrawn), a USB port 10 is formed, through which a USB cable and external storage devices such as a USB memory can be connected.

Figure 2:
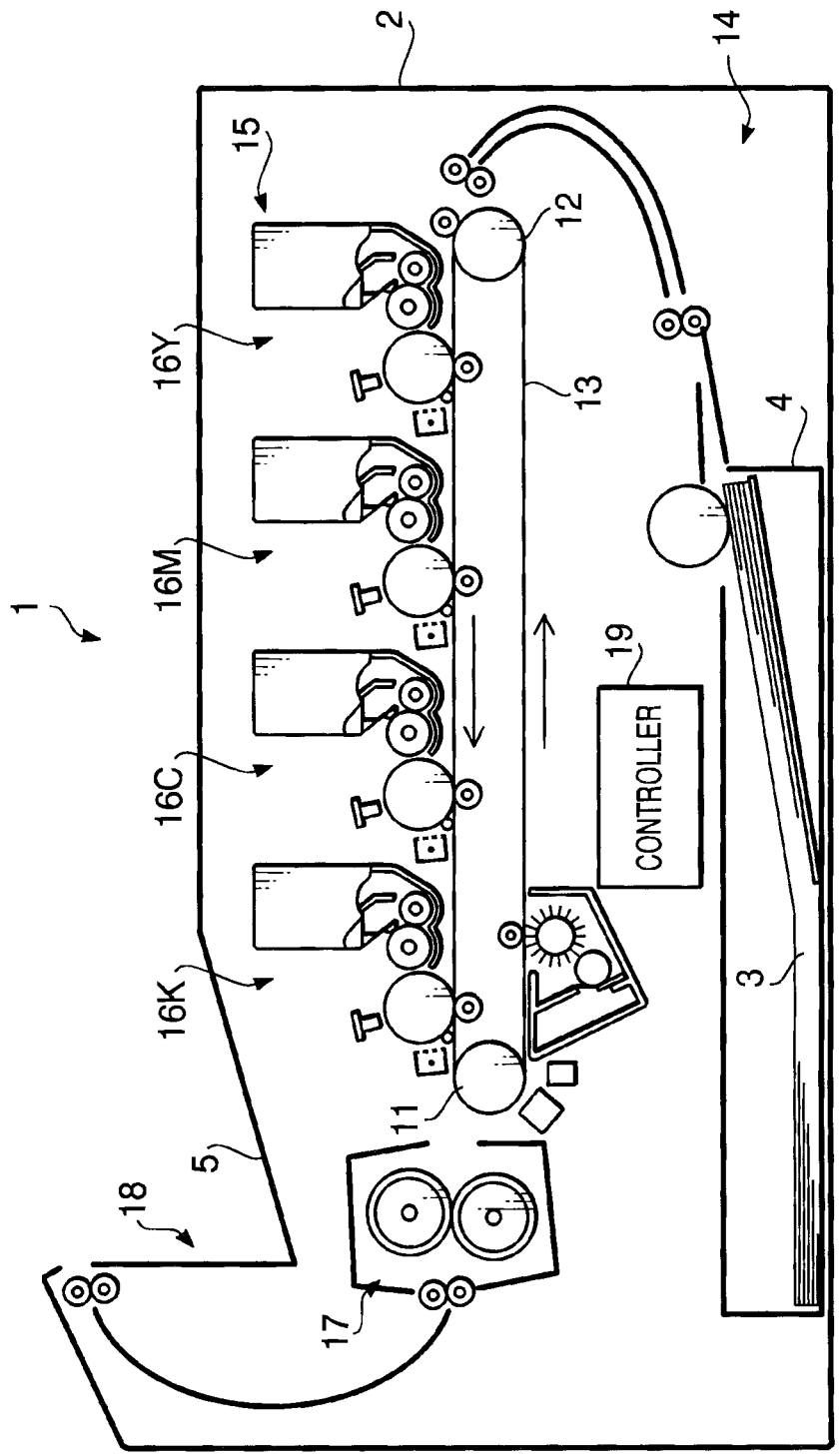
FIG. 2 is a block diagram schematically illustrating an electrical configuration of the laser printer shown in FIG. 1.

FIG. 2 schematically shows an electric configuration of the laser printer 1 shown in FIG. 1.

The laser printer 1 includes a belt driving roller 11 and a driven roller 12 are arranged inside the casing 2. A sheet feed belt 3 is wound around the belt driving roller and the driven roller 12, and the belt driving roller 11 is rotated to move the sheet feed belt 13 in a counterclockwise direction in FIG. 2. On an upstream side of the belt driving roller 11 and driven roller 12 (i.e., below the driven roller 12 in FIG. 2), a sheet feed section 14 is defined. At the sheet feed section 14, each printing sheet 3 is picked up from the sheet feed cassette 4 and fed to an image formation section 15.

In the image formation section 15, image forming units 16Y, 16M, 16C and 16K are arranged along a sheet feed direction of the sheet feed belt 13. The image formation units 16Y, 16M, 16C and 16K accommodate yellow (Y), magenta (M), cyan (C) and black (K) toners therein, and form (overlay) toner images of respective colors on the printing sheet 3 fed by the sheet feed belt 13. On a downstream side of the image forming units 16Y-16K, a fixing section 17 is defined. The visible toner image formed on the printing sheet 3 is fixed at the fixing section 17.

On the downstream side of the image formation section 15, a sheet ejection section 18 is defined. The printing sheet 3, on which an image is formed by the image formation section 15, is ejected onto the sheet ejection tray 5.

Figure 3:
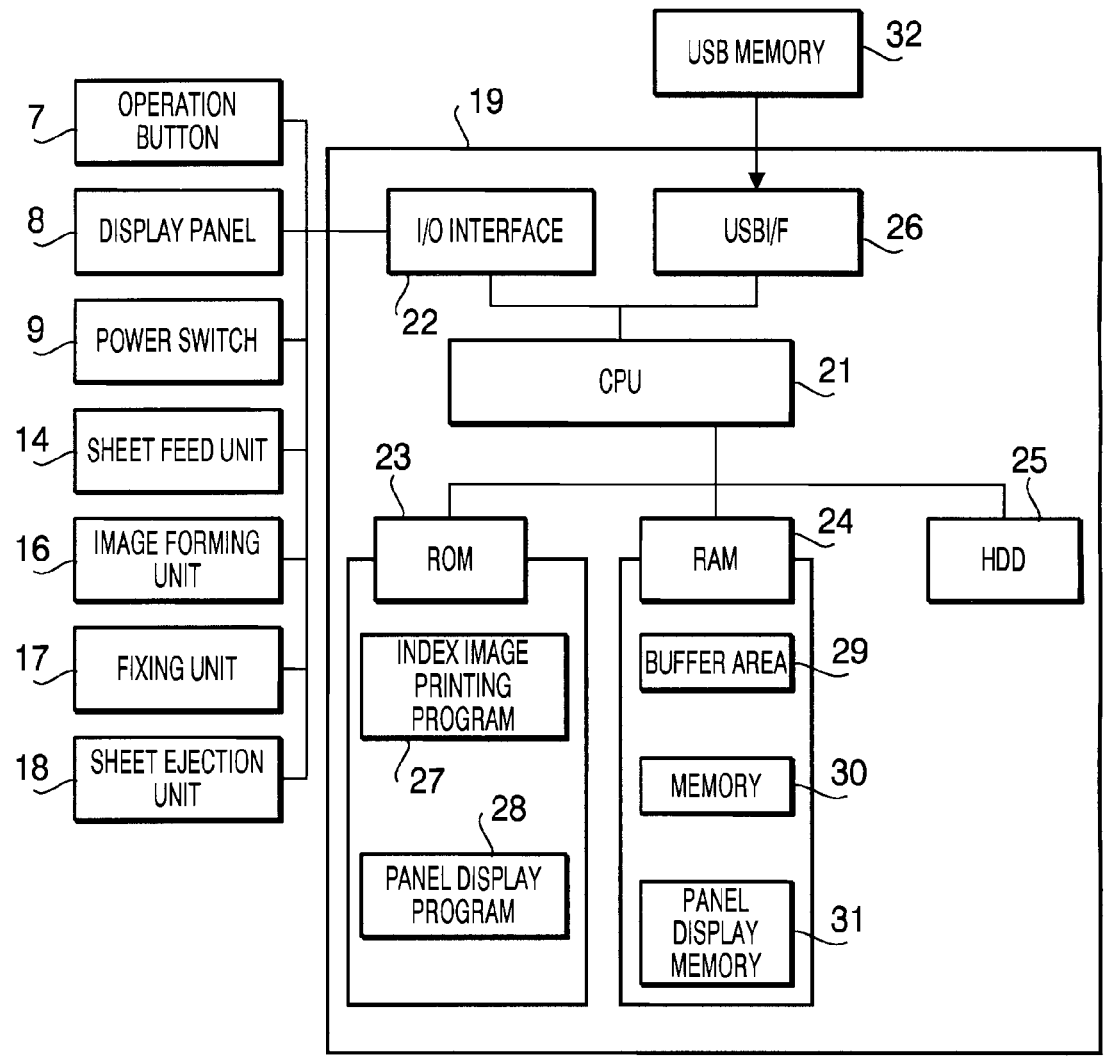
FIG. 3 is a block diagram schematically illustrating a configuration of a controller, which controls operation of the laser printer shown in FIG. 1, according to a first embodiment.

FIG. 3 is a block diagram illustrating a configuration of a controller 19 (see also FIG. 2). The controller 19 is a kind of well-known computer and executes processing/operating data under control of a CPU 21. The CPU 21 is connected with an input/output interface (I/O interface) 22, a ROM (Read Only Memory) 23, a RAM (Random Access Memory) 24, an HDD (Hard Disk Drive) 25 and a USB interface (USB I/F) 26.

The CPU 21 performs processing/operation of data as described above. the I/O interface 22 is connected with the operation button 7, the display panel 8, the power switch 9, the sheet feed section 14, the image formation unit 16, the fixing section 17 and the sheet discharging section 18.

The ROM 23 is a read-only non-volatile memory and stores various pieces of data and various kinds of programs. In particular, the ROM 23 stores an index image printing program 27 for executing an index image print process and a panel display program 28 for executing a panel display process.

The index image printing program 27 (the index image printing process) is for printing index images and file ID information associating with the index images. The index image printing process will be described in detail, referring to FIG. 6.

FIG. 4 shows an example of a printing result when the image printing program 27 is executed. As shown in FIG. 4, on the printing sheet 3, a plurality of image arrangement sections 42 are arranged in a row direction (i.e., X direction) and a column direction (i.e., Y direction), as a matrix, within an arranging area 41. Each arrangement section 42 includes an index image arranging area 43 in which the index image is allocated, and a file ID information arranging area 44 for indicating the file ID information corresponding to the index image displayed in the index image arranging area 43 in the same image arrangement section 42. Specifically, according to the first embodiment, within the file ID information arranging area 44, a serial number display area 45 for displaying a serial number assigned to each arrangement section 42, a file ID information display area 46, and an update information display area 47 are provided. In this embodiment, the file ID information display area 46 is configured to display the entire file ID information 21 if the number of letters/characters/symbols (hereinafter, simply expressed as "letters" for brevity) of the file ID information is 21 (twenty-one) or less (including extension). However, if the number of letters of the file ID information is 22 or more, only a part of the information (i.e., from a top to an intermediate portion of the letters of the file ID information (such a part of the information will be referred to as a clipped file ID information 50) is displayed in the file ID information display area 46.

In this specification, a term "index image" represents a small image converted from the data stored in each file which may be image data file created by a digital camera, text data file, and the like. The index image of the text data file is an image file in which letters of the text data file is converted into image data. A term "file information" represents information related to the file. The file information may include, for example, a file name, a file path name, property of data (e.g., create date, update date, creator, etc., trains of text at a top portion of the file when the file is a text data file. A term "serial number" represents the serial number assigned to each arrangement section 42. A term "file ID information" represents one of pieces of information contained in the file information, and one for identifying respective files. For example, the file information may contain a file name and/or a train of text of the data, extension, and the like. A term "update information" represents data related to update of the file. For example, the file ID information may contain a date (y/m/d) and time (h/m).

As shown in FIG. 4, on the printing sheet 3, an auxiliary area 48 is provided outside the arrangement area 41. In the auxiliary area 48, supplementary information regarding the file information is printed. For example, the entire file ID information, of which clipped information is printed in the arrangement area 41, is printed in the auxiliary area 48 together with reference information 49.

Incidentally, a panel display program 28 shown in FIG. 3 is, when executed by the CPU 21, for executing a panel display process (described later) to display file ID information on the display panel 8.

FIGS. 5A and 5B show examples of indications displayed on the display panel 8 when the panel display process is executed. In this example, FIG. 5A shows an example before the index image printing is performed, and FIG. 5B shows an example after the index image printing has been performed.

On the display panel 8, the file ID information (e.g., "1.jpg") is displayed together with the serial number (e.g., "No. 1"). If the number of letters of the file ID information exceeds a predetermined number (see No. 2 of FIG. 5A), only a part of (i.e., from the top to an intermediate portion of) the file ID information is displayed on the display panel 8 before the index image printing is executed. After the index image printing is finished, the reference information 49 is displayed (see No. 2 of FIG. 5B) instead of the part of the file ID information.

Back to FIG. 3, the RAM 24 is a readable/writable volatile memory and stores various types of data and programs. As shown in FIG. 3, the RAM 24 is provided with a buffer area 29, a memory 300 and a display memory 31. The buffer area 29 is for storing index images and file information to be used when the index image is printed. The memory 30 is for storing the entire file ID information if the number of the letters exceeds the predetermined number. The display memory 31 is for storing the reference information 49 to be displayed on the display panel 8.

The I-IDD 25 is a readable/writable storage (non-volatile).

The USB I/F 26 is for outputting/inputting data to/from an external storage such as a USB memory 32 connected to the USB port 10 (see FIG. 1).

FIG. 6 is a flowchart illustrating an index image printing process which is performed when the index image printing program 27 shown in FIG. 3 is executed by the CPU 21.

The index image printing program 27 is retrieved from the ROM 23 and written in the RAM 24, and is executed when, for example, the USB memory 32 storing image files and/or document files is inserted into the USB port 10, and the index image printing command is input through the operation button 7.

When the index image printing process is started, in S1 (step 1) the process initializes arrangement area information stored in the buffer area 29 so that the data used for previously performed index image printing process is deleted. The arrangement area information is information related to the arrangement area 41 (see FIG. 4). For example, the arrangement information includes a set range of the arrangement area 41, the number of the arrangement sections 42 which can be arranged in the row and column direction within the arrangement area 41 (see FIG. 4), a set range of one arrangement section 42, information representing whether data is allocated to the each arrangement section 42, the size of the index image which can be allocated to the index image arrangement area 43, condition of data arranged in the file information arrangement area 44 (e.g., a method of assigning the serial number, the number of letters which can be arranged within the file ID information display area 46, a method of displaying the update information, a type of the data arranged within the file information arrangement area 44, etc.). According to the first embodiment, the index images and associating file ID information are arranged from the left to right, and from the top to bottom in the arrangement area 41, in the order of retrieval.

In S2, the process retrieves one file from the USB memory 32. Then, in S3, the process analyzes the retrieved file and obtains the index image data of the file and file information of the retrieved file. In S4, the process obtains the arrangement area information from the buffer area 29. In S5, the process stores the index image obtained in S3 in the buffer area 29 so that the index image corresponds to the arrangement area 43 of the predetermined arrangement section 42 based on the arrangement area information obtained in S4.

In S6, the process judges whether the number of letters of the file ID information included in the file information obtained in S3 is within the predetermined number or greater. The predetermined number of letters is the maximum number of the letters which can be allocated to the file ID information display area 46. That is, if the number of letters of the file ID information is equal to or less than the predetermined number (i.e., the maximum number), the entire file ID information can be printed within the file ID information display area 46. According to the first embodiment, the maximum number is 21.

If the number of letters of the file ID information is equal to or less than the predetermined number (S6: YES), the process stores the file information obtained in S3 in the buffer area 29 in correspondence with the file ID information display area 46 of the predetermined arrangement area 42 (S7). Then, in S8, the process updates the arrangement area information in the buffer area 29. With the above process, one of the files stored in the USB memory 32 has been arranged to one of the arrangement sections 42. After S8, the process proceeds to S9.

If the number of letters of the file ID information contained in the file information obtained in S3 is greater than the predetermined number (S6: NO), it is impossible to print all the letters of the file ID information within the file ID information display are 46. In such a case, the process stores the file ID information (of which the number of letters is greater than the predetermined number) in the memory 30.

In S11, the process replaces the file ID information stored in the memory 30 with the clipped file ID information 50 and the reference information 49. The clipped file ID information is configured such that a symbol "~" is inserted between a leading character string and the extension so that the clipped portion can be identified. The reference information 49 is created such that the clipped file ID information and non-clipped (i.e., original) file ID information are related with each other. According to the first embodiment, the reference information 49 is configured to include an asterisk "*" and a serial number assigned to the file ID information of which the number of letters exceeds the predetermined number.

In S12, the process stores the replaces file information, which includes the reference information 49, in the buffer area 29 in correspondence with the file ID information display area 46 of the predetermined arrangement area 42.

In S13, the process calculates the size of the necessary auxiliary area 48, and updates the arrangement area information in the buffer area 29. Specifically, the process calculates the set range (i.e., an area) of the auxiliary area 48 necessary for placing the file ID information stored in the memory 30, and reduces the set range (area) of the arrangement area 41 by the calculated amount of the auxiliary area 48. With this process, the arrangement area 41 and the auxiliary area 48 can be arranged on the same printing sheet 3. Then, the process proceeds to S9.

In S9, the process judges whether the arrangement area 41 is full of data. This step is executed to check whether the index images and associating file information are arranged in all the arrangement sections 42 in the arrangement area 41.

If the arrangement area 41 is full of data (S9: YES), even if data is further retrieved from the USB memory 32, there is no arrangement sections 42 on which further index images or the file information are allocated. In such a case, in S14, the process checks whether there is file ID information in the memory 30. If there is no file ID information in the memory 30 (S14: NO), no information to be printed in the auxiliary area 48 exists. Therefore, in S15, the process prints out the index images and associating file information stored in the buffer area 29 to form the index image. Then, the process proceeds to S16.

If there remains file ID information in the memory 30 (S14: YES), the process stores the file ID information in the memory 30 in the buffer area 29 together with the reference information 49 in correspondence with the auxiliary area 48. Then, in S19, the process prints out the data in the buffer area 29 on the printing sheet 3. With this process, the index images stored in S5 and the file ID information stored in S7, or the clipped file ID information 50 and the reference information 49 stores in S50 are printed in the arrangement area 41 of the printing sheet 3. Further, the non-clipped file ID information, which is clipped in the arrangement area 41, is printed together with the reference information 40. Then, the process proceeds to S16.

In S16, the process judges whether there remain retrievable files in the USB memory 32. This step is for checking whether there remain further files to be subjected to the index image printing. If no retrievable files remain in the USB memory 32 (S16: NO), which means that the index image for all the flies stored in the USB memory 32 has been printed, and the process terminates the index image printing process.

If there remains a retrievable file in the USB memory 32 (S16: YES), in order to print another index image for the remaining files on the next printing sheet 3, the process initializes the arrangement area information in the buffer area 29. With this step, the set range of the arrangement areas 41 which is set in printing the previous index image is initialized. Further, the index images and associating file information arranged in the arrangement sections 42 are deleted. Then, the process returns to S2, and steps as described above are repeated to print the index image for the files remaining in the USB memory 32.

If the index images and associating file information has not been assigned to one of more of the arrangement area 41 (S9: NO), the process checks whether there remains a retrievable file in the USB memory 32. That is, the process judges whether there remain a file subjected to the index image in the USB memory 32. If there remain retrievable files in the USB memory 32 (S20:YES), the process retrieves one file from the USB memory 32 and returns to S2 to arrange the index image of the retrieved file within the arrangement section 42 (S2).

If no retrievable files remain in the USB memory 32 (S20: NO), the process checks, in S21, whether there is file ID information in the memory 30. If there is no file ID information in the memory 30 (S21: NO), the process prints out the index image regarding the buffer area 29 and terminates the process shown in FIG. 6.

If there remains the file ID information in the memory 30 (S21:YES), the process stores the file ID information and the reference information 49 in the memory 30 in the buffer area 29 so as to correspond to the auxiliary area 48 so that the entire file ID information and the reference information 39 are printed in the auxiliary area 48 of the printing sheet 3. Then, in S24, the process prints the index image and file ID information stored in the buffer area 29 as in S19, and finishes the process.

FIG. 7 is a flowchart illustrating a panel display process which is performed when the panel display program 28 shown in FIG. 3 is executed by the CPU 21.

The panel display program 28 is retrieved from the ROM 23 and written in the RAM 24, and is executed when, for example, the file ID information display command is input through the operation button 7.

When the panel display process is started, in S31, the process retrieves a file from, for example, the USB memory 32. Then, in S32, the process judges whether there is data in the display memory 31. With this judgment, the process determines whether the file ID information is to be displayed on the display panel 8 or the reference information 49 is to be displayed.

If no data is stored in the display memory 31 (S32: NO), the process displays the file ID information on the display panel 8 together with the serial number of the arrangement section 42 corresponding to the index printing (S35). In this case, if the number of letters of the file ID information is equal to or less than the predetermined number, the entire file ID information is displayed on the display panel 8. If the number of letters of the file ID information is greater than the predetermined number, only a displayable portion, from the top, of the file ID information is displayed on the display panel 8.

If the process judges that there is data in the display memory 31 (S32: YES), the process retrieves the reference information 49 stored in the display memory 31 (S33). Then, in S34, the process replaces the file ID information of the retrieved file with the reference information 49 stored in the display memory 31. Then, in S35, the process displays the reference information 49 together with the serial number of the index image on the display panel 8 (see FIG. 5B).

As described above, according to the first embodiment, if the entire file ID information, "Testdata_031620061700_bunsho¥20060222¥bunshodata¥version1.PDF" (see FIG. 4; No. 2) cannot be printed within the arrangement section 42 of the arrangement area 41 as the number of letters exceeds the predetermined number (i.e., which is 21 according to the first embodiment) (see S6 of FIG. 6), the clipped file ID information "Testdata~.PDF" is printed in the arrangement section 42 with the index image, and the entire file ID information (i.e., "Testdata_031620061700_bunsho¥20060222¥bunshodata¥version1.PDF") corresponding to the clipped file ID information ("Testdata~.PDF") is printed in the auxiliary area 48 (see FIGS. 6; S21, S23 and S24), the user can identify the file referring to the entire file ID information printed in the auxiliary area 48.

In some cases, for example, the arrangement section 42 having the serial number "No. 6" in FIG. 6, when the initial character strings are converted into the index image and printed on the index image arrangement area 43, the character strings may be indicated as series of dots. In other cases, as indicated by the serial numbers "No. 2", "No. 3" and "No. 4" in FIG. 4, first pages of a plurality of files are substantially the same, but contents thereof have been revised so that the file names thereof are differentiated by adding version numbers, the user has a difficulty in distinguishing the files by the index images thereof. In the above cases, even if the file ID information has a relatively large number of letters, the user can recognize respective files referring to the file ID information, which is printed on the same printing sheet 3 on which the corresponding index images are printed.

Although the clipped file ID information 50 and non-clipped file ID information are printed at separate portions on the printing sheet 3, since the reference information 49 which represents the correspondence between the clipped file ID information and non-clipped file ID information is added to the clipped file ID information 50 in the arrangement section 42 and the entire file ID information in the auxiliary area 48, the user can recognize the correspondence therebetween relatively easily.

Further, the reference information 49 is also indicated on the display panel 8 (see FIG. 5B), the user can easily connect the information displayed on the display panel 8 with the file ID information printed in the auxiliary area 48 on the printing sheet 3 referring to the reference information 49.

Still further, when the non-clipped file ID information is printed in the auxiliary area 48 of the printing sheet 3, the area of the arrangement area 41 is reduced by the same amount necessary for printing the entire file ID information in the auxiliary area 48 (see FIG. 6; S13), it is ensured that the index image, the clipped file ID information thereof and the non-clipped file ID information are printed on the same printing sheet 3.

Next, a second embodiment of the invention will be described referring to the laser printer 1. A hardware configuration of the laser printer according to the second embodiment is substantially the same. An index image printing process according to the second embodiment is different from that of the first embodiment.

In the following description regarding the second embodiment, the index image printing process is described in detail. In the description and drawings, elements, programs, etc. which are common with respect to the first embodiment, the same reference numerals are given, and description thereof is simplified for brevity.

FIGS. 8 and 9 show a flowchart illustrating the index image printing process according to the second embodiment.

Similar to the first embodiment, after the initialization (S1), the process retrieves a file from the USB memory 32 (S2). If the number of letters of the file ID information is equal to or less than the predetermined number, the process allocate the index image and file information retrieved from the USB memory 32 to the arrangement section 42 to update the same, and proceeds to S9 (S1-S5, S6:YES, S8).

If the number of letters of the file ID information exceeds the predetermined number, the process stores the file ID information retrieved from the USB memory 32 n the memory 30. The, the process replaces the file ID information with clipped file ID information 50 and reference information 49, and stores the file information including the clipped file ID information and the reference information 49 in the buffer area 29. The process further stores the reference information in the display memory 31, and proceeds to S9 (S6:NO, S10-S12). It should be noted that, according to the second embodiment, the size of the auxiliary area 48 for displaying the file ID information is not calculated, and the set area of the arrangement area 41 is not reduced correspondingly.

In S9, if the arrangement area 41 is full of data, the process prints out the index image data and the file ID information stored in the buffer area 29 (in S6-S7, or S12) on the printing sheet 3 (S9:YES, S41). In S42, the process judges whether there remains a retrievable file in the USB memory 32. If there is a retrievable file in the USB memory 32, the process initializes the arrangement area of the buffer area 29, returns to S2, and prints out the index image, i.e., the index images and file ID information, or index images, clipped file ID information and the reference information 49 (S42: YES, S43).

If there is no retrievable file in the USB memory 32 (S42: NO), the process judges whether there is file ID information in the memory 30 (S44). If there is no file ID information in the memory 30 (S44: NO), it is unnecessary to print the file ID information in the auxiliary area 48 which is outside the arrangement area 41.

If there is a retrievable file in the USB memory 32 (S44: YES), the process initializes the arrangement area information in the buffer area 29 in S45, set the entire area of the printing sheet 3 as the auxiliary area 48, and stores the file ID information in the buffer area 29 corresponding to the auxiliary area 48 (S46). Then, the process prints out the file ID information stored in the buffer area 29. In this case, the arrangement area is full of data (S9: YES), it is impossible to set the auxiliary area 48 on the same printing sheet 3 on which the corresponding index images and clipped file ID information 50. Therefore, the process set the auxiliary area 48 on another printing sheet 3, and prints out the file ID information and the reference information 49. Thus, the file ID information is printed at the end of the index image printing.

If the arrangement area is not full of data (S9: NO), no retrievable file remains in the memory 30 (S20: NO), and there is file ID information in the memory 30 (S21: YES), the process calculates the area of the auxiliary area 48 for printing the file ID information in based on the file ID information stored in the memory 30. In S49, the process judges whether the calculated area of the auxiliary area 48 is smaller than the remaining area of the printing sheet 3 after the set area of the arrangement area 41 is subtracted. Based on this judgment, it is possible to determine whether the auxiliary area 48 is provided on the same printing sheet 3 on which the index image is printed, or anther printing sheet 3 should be used for the auxiliary area 48.

If the set area of the auxiliary area 48 is the remaining area (S49: YES), the process stores the file ID information stored in the memory 30 in the buffer area 29 corresponding to the auxiliary area 48. Then, in S51, the process prints out the data stored in the buffer area 29 corresponding to the arrangement area 41 and the auxiliary area 48. The is, the index image is printed on the printing sheet 3 by arranging the index images and the file ID information or clipped file ID information 50 in respective arrangement sections 42, and on the same printing sheet 3, the auxiliary area 48 is provided outside the arrangement area 41, and the entire file ID information corresponding to the clipped file ID information is printed together with the reference information 49.

If the set area of the auxiliary area is larger than the remaining area (S49: NO), the printing sheet 3 may be changed to another one during a list of the file ID information is printed in the auxiliary area 48. Such a condition is not preferable since the file ID information is illegible. In order to avoid such a condition, after the process retrieves the index image data and file ID information or the clipped file ID information corresponding to the arrangement area 41 and stored in the 29 and prints out the same in S52, the process initializes the arrangement area information of the buffer area 29 and the entire printing sheet 3 is set as the auxiliary area 48 (S53). Then, in S54, the process stores the file ID information stored in the memory 30 in the buffer area 29 corresponding to the auxiliary area 48. Therefore, at this stage, the buffer area 29 does not store the index images, clipped file ID information 50, or reference information 49 (the information to be printed in the arrangement area 41), but only the information to be printed in the auxiliary area 48 is stored. In S55, the process retrieves the file ID information and reference information 49, and prints the same on another printing sheet 3.

As above, if the auxiliary area 48 is larger than the remaining area of the printing sheet 4 excluding the arrangement area 41, the auxiliary area 48 is provided on another printing sheet 3, and is not provided on the printing sheet 3 on which the index images and file ID information are printed (FIG. 9, S49: YES, S53-S55). Thus, a list of the file ID information and reference information 49 corresponding to the clipped file ID information are printed on the printing sheet 3, legibility is improved. In this case, if the clipped file ID information is also indicated together with the reference information 49, the user can recognize the correspondence between the clipped file ID information and reference information 49, and enables the user to identify the file allocated to the arrangement sections 42.

The above-described first and second embodiments are merely illustrative embodiments, and various modification can be made without departing from the scope of the invention.

For example, in the first and second embodiments, when the number of letters of the file ID information exceeds the predetermined number, the clipped file ID information 50 and the reference information 40 are printed in the file ID information indication section 46. This configuration may be modified such that only the reference information 49 or the clipped file ID information 50 may be printed in the file ID information indication section.

In the first and second embodiments, the reference information 49 and a complete character string of the corresponding file ID information are printed in the auxiliary area 48. This configuration may be modified such that the serial number of the arrangement sections 42 may further be printed in the auxiliary area 48 to clarify the correspondence between the files allocated to the arrangement sections 42 and the file ID information printed in the auxiliary area 48.

It may be possible to configure that only the file ID information is indicated in the auxiliary area 48 in order to reduce toner consumption.

In the first embodiment, the reference information 49 is displayed on the display panel 8. This configuration may be modified such that the reference information 49 is displayed together with the clipped file ID information 50. Alternatively, only the clipped file ID information may be displayed instead of the reference information 49. If the clipped file ID information 50 is displayed on the display panel 8, it is advantageous in that by referring to the file ID information printed in the auxiliary area 48 of the printing sheet 3, the user can recognize the complete information corresponding to the clipped file ID information displayed on the display panel 8.

Next, a laser printer according to a third embodiment of the invention will be described. The appearance of the laser beam printer 1 is the same as the first embodiment shown in FIG. 1.

A hardware configuration of the laser printer 1 according to the third embodiment is substantially the same as that of the first and second embodiments. Therefore, the same reference numerals are used for the same components, and description thereof will be simplified for brevity.

FIG. 10 is a block diagram of the controller 19 of the laser printer 1 according to the third embodiment. According to the third embodiment, the ROM 23 stores the index image printing program 27 which, when executed by the CPU 21, the index image printing process shown in FIG. 12 is executed.

FIG. 11 shows an example of printing result when the index image printing process according to the third embodiment is executed. As shown in FIG. 12, and similarly to the first embodiment, on the printing sheet 3, a plurality of image arrangement sections 42 are allocated in a row direction (i.e., X direction) and a column direction (i.e., Y direction), as a matrix, within an arranging area 41. Each arrangement section 42 includes the index image arranging area 43 and the file ID information arranging area 44. Further, within the file ID information arranging area 44, the serial number display area 45, the file ID information display area 46, and the update information display area 47 are provided.

According to the third embodiment, the file ID information display area 46 is configured such that the maximum number of letters is 24 (twenty-four). If the length of the file ID information exceeds 24 letters, the file ID information is printed in a plurality of lines in the file ID information display area 46. Therefore, the size of the file ID information display area 46 varies depending on the length of the file ID information. In accordance with the variation of the file ID information display area 46, the size of the arrangement section 42 varies (i.e., the length thereof in the Y direction varies). As a result of the change of the length of the arrangement section 42, a distance between adjacent rows may vary, which will be described in detail.

According to the third embodiment, the index images area aligned in the order of the length of the file ID information. Specifically, the index images are sorted in ascending order of the number of the letters of the file ID information, and the arrangement sections 42, in which the index images and associating file ID information are allocated, are aligned in this order from the left to right, and top to bottom.

The RAM 24 (see FIG. 10) includes a file ID information storing table 33 and the buffer area 29. The file ID information storing table 28 is for storing file ID information of the files retrieved from a storage, e.g., the USB memory 32. The buffer area 29 stores the index images and file information to be used when the index images are printed.

FIG. 5 shows a flowchart illustrating the index image printing process which is performed when the index image printing program 27 is executed by the CPU 21. As mentioned above, when the index image printing process is performed, the index images and associating file ID information are sorted in the order of the number of the letters of the file ID information, in the ascending order, and the sorted index images and the file ID information are allocated to the arrangement sections 42, respectively, which are printed on the printing sheet 3.

In S61, the process initializes the arrangement area information stored in the buffer area 29 to delete the arrangement information created in the previous execution of the index image printing process.

In S62, the process retrieves all the files stored in the USB memory 32 connected to the USB port 10, and stores the same in the RAM 24. In S63, the process extracts the file ID information from all the files stored in the RAM 24, and registers the same with the file ID information storing table 33. At this stage, the process registers the file ID information with the file ID information storing table 33 in the order where the files are stored in the USB memory 32.

In S64, the process checks the length (i.e., the number of the letters) of the file ID information registered with the file ID information storing table 28, and sort the file ID information data in the ascending order of the number of the letters. Then, in S65, based on the result of the sort in S64, the order of the file arrangement is determined. As described above, according to the third embodiment, the files are allocated to the arrangement sections 42, respectively, from the small number of letters to the larger number of letters.

In S66, the process obtains the arrangement area information from the buffer area 29. When the arrangement area information is initialized, no data is assigned to all the arrangement sections 42. A serial number is assigned to the arrangement sections 42 from the left to right, top to bottom. The serial number of each arrangement section 42 is indicated in the serial number indication area 45.

In S;67, the process identify the file ID information having the shortest length among the file ID information which has not yet allocated to the arrangement sections 42, referring to the file ID information storing table 28. Then, the process obtains the index image and the file information corresponding to the identified file ID information. It should be noted that whether the file ID information has been allocated to the arrangement sections 42 or not can be judged using a flag (0: not yet allocated; 1: allocated) which is set for each piece of file ID information data. Such flags may be stored in anther table. Since the usage of flags are well-known, detailed description thereof is not provided for brevity.

Next, the process examines the arrangement area information obtained in S66, and in accordance with the serial number, the first arrangement section 42 among those in which no data has been allocated. Then, the process allocates the index image data corresponding to the file information onto the index image data arrangement area 43 of the extracted arrangement section 42, and the entire file ID information included in the file information onto the file ID information display area 46 of the extracted arrangement section 42. Further, the process arranges the file update information included in the file information on the update information display area 47 of the extracted arrangement section 42.

As mentioned above, the length of the file ID information differs for respective files. If the number of the letters of the file ID information exceeds the maximum number for a line of the file ID information display area 46 (i.e., 24 letters), the area of the file ID information display area 46 is expanded in the column direction (i.e., Y-direction), and the file ID information is indicated in a plurality of lines. As the area of the file ID information display area 46 is expanded, the area of the arrangement section 42 is expanded. When the arrangement section 42 is expanded in the Y-direction, the layout of the arrangement area 41 is changed such that a distance between the row of the expanded arrangement section 42 and the next row is elongated. By changing the layout of the arrangement area 41, the index images on the next row are aligned along the row direction.

The arrangement section 42 to which the index image data and file ID information are allocated is stored in the buffer area 29. If the set range (i.e., area) of the arrangement section 42 has been changed, as described above, the information regarding the change of the area is also stored in the buffer area 29.

In S68, the arrangement area information which has been changed as the data is allocated to the arrangement section 42 in S67 is updated. With this step, one of the arrangement section 42 which was a blank section is filled with the index image data, serial number, file ID information and update information. Further, if the area of the arrangement section 42 has been expanded in the column direction, the layout of the arrangement section 42 is also updated.

In S69, the process refers to the arrangement area information of the buffer area 29, and judges whether all the arrangement sections 42 are filled with the index image data, file ID information and update information, thereby judging whether the arrangement area 41 is filled with data.

If there is a blank arrangement section 42, the process judges that the arrangement area 41 is not full of data (S69: NO). In such a case, the process judges whether there remains a file which is to be allocated to an arrangement section 42 by checking whether there remains the file ID information which has not yet been allocated to the arrangement section 42, referring to the file ID information storing table 28 (S70). If there remains the file ID information which has not allocated to the file ID information storing table 28 (S70: YES), the process returns to S66. Then, the process allocates the index image data, file ID information and update information of the remaining file onto the next arrangement section 42 which is a blank section by executing S66 and the following steps.

When the process allocates the index image data, file ID information and the update information of each file onto the arrangement section 42 in accordance with the serial number, if all the file ID information of the file ID information storing table 28 has been allocated to the arrangement sections 42 before the arrangement area 41 becomes full of data (S69: YES), the process judges that not files to be processed remain (S70: NO). Then, in S71, the process prints out the information stored in the buffer area 29 on the recording sheet 3. That is, the process executes the index image printing such that the index image data, file ID information, update information and the serial number from the top of the arrangement section 42 to an intermediate one, and terminates the index image printing process.

If the file ID information has bee allocated to all the arrangement sections 42, and thus, the process judges that the arrangement area 41 is full of data (S69: YES), the process prints out the data stored in the buffer area 29. That is, the process executes the index printing so that the index images, file ID information, update information and the serial numbers are indicated in all the arrangement sections 42. Then, in S73, the process judges whether there remains a file to be allocated to the arrangement section 42 as in S70.

If there remains a file to be allocated (S73: YES), the process initializes the arrangement area information in the buffer area 29 to cancel the data used in the previous index printing (S74). By executing S74, all the arrangement sections 42 become blank, and the distance between two rows is also initialized. Then, the process returns to S66, the process allocates the index image data and file ID information to the arrangement sections 42 to perform the index image printing onto another printing sheet 3.

If there remains no file to be allocated (S73: NO), the process is terminated.

As described above, according to the third embodiment, if the length of the file ID information is too long and cannot be indicated in one line in the file ID information display area 46, the file ID information display area 46 is expanded so that the file ID information is indicated in a plurality of lines. In addition, the file ID information is sorted based on the length thereof, and a plurality of pieces of the file ID information together with the index image data are allocated to the arrangement sections 42 which are arranged in the row direction, in the sorted order. Therefore, all the file ID information can be legibly arranged in the arrangement sections 42.

The arrangement section 42 of which the serial number is "No. 9" in FIG. 11 shows the index image of a document file. That is, if the index image data corresponds to the character strings of a document file, the characters may be indicated as dots.

The arrangement sections 42 of which the serial numbers are "No. 7" and "No. 8" are index images of revised versions of a report of which an index image is shown in the arrangement section 42 having the serial number "No. 2". In this case, a numeral representing a version history is added at the end portion of the file names of the revised versions. As is understood from FIG. 11, the user cannot distinguish the three "report" files based on the index images since they are the same. The user can identify each file based on the file ID information indicated in the file ID information display area 46 since the entire file ID information is indicated in each file ID information display area 46.

According to the third embodiment, a plurality of pieces of the file ID information are sorted based on the length (i.e., the number of letters) thereof. Therefore, the files having the file ID information consists of the close of same number of letters are allocated to the arrangement sections 42 which are located close to each other. For example, the file ID information "testdata_031620061700_TIFFbunsho_Ver1.PDF" and the file ID information "testdata_031620061700_TIFFbunsho_Ver2.PDF" have the same number of letters. Such file ID information could be allocated to the arrangement segments 42 on the same row. Therefore, the index images and the entire file ID information are printed legibly on the printing sheet 3, which enables the user to recognize the contents of the documents or identify the desired document.

If the arrangement sections 42 containing relatively short file ID information and those containing relatively long file ID information are arranged on the same row, blank lines are included in the file ID information display area 46 for the sort file ID information. Such an arrangement of the arrangement sections 42 are illegible and printing efficiency is lowered. According to the third embodiment, since a plurality of the file ID information are sorted based on the length thereof, the lengths of the file ID information in the same row are substantially the same. Therefore, unnecessary blank lines will not be included in the file ID information display area 46, which provides with legible printout. Further, the printing efficiency is improved.

Further, according to the third embodiment, a distance between adjacent rows are adjusted so that the index images (i.e., arrangement areas 42) are aligned in each row. Therefore, both index images and file ID information are legibly printed on the printing sheet 3.

In the third embodiment, the file ID information is sorted in the ascending order of the length. It can be modified that the sort is made in the descending order. According to another aspect, it may be possible to calculate the printing efficiency within a predetermined area, for example, based on the area (i.e., size) of the file ID information display area 46 (or, arrangement section 42) and determine the order of the arrangement of the files (index images and file ID information) so that the printing sheet 3 is used efficiently. Since the file ID information is indicated in a plurality of lines if it is long, the sort of the file ID information may be executed based on the number of lines of the file ID information.

In the third embodiment, the file ID information storing table 28 is generated and the file ID information are sorted referring to the file ID information stored in the table 28. Alternatively, a file information storing table for containing all the file information may be generated in the RAM 24. Then, a process may extract the file ID information from the file information storing table and examine the length of the extracted file ID information, and sort the file information stored in the RAM 23.

Next, a laser printer 1 according to a fourth embodiment of the invention will be described. The appearance of the laser beam printer 1 is the same as the first embodiment shown in FIG. 1.

A hardware configuration of the laser printer 1 according to the fourth embodiment is substantially the same as that of the first, second and third embodiments. Therefore, the same reference numerals are used for the same components, and description thereof will be simplified for brevity.

FIG. 13 is a block diagram of the controller 19 of the laser printer 1 according to the fourth embodiment. According to the fourth embodiment, the ROM 23 stores the index image printing program 27 which, when executed by the CPU 21, the index image printing process shown in FIG. 15 is executed. The RAM 24 includes a file storage area 34, the buffer area 28, and an arrangement area information storage area 35 are provided. The file storage area 34 is for storing files retrieved from a recording medium such as the USB memory 32. The arrangement area information storage area 35 is for storing information regarding whether the index image and file ID information are allocated to each arrangement section 42.

FIG. 14 shows an example of printing result when the index image printing process according to the fourth embodiment is executed. As shown in FIG. 15, and similarly to the first embodiment, on the printing sheet 3, a plurality of image arrangement sections 42 are allocated in a row direction (i.e., X direction) and a column direction (i.e., Y direction), as a matrix, within an arranging area 41. Each arrangement section 42 includes the index image arranging area 43 and the file ID information arranging area 44. Further, within the file ID information arranging area 44, the serial number display area 45, the file ID information display area 46, and the update information display area 47 are provided.

According to the fourth embodiment, the file ID information display area 46 is configured such that the maximum number of letters is 24 (twenty-four). If the length of the file ID information exceeds 24 letters, the file ID information is printed in a plurality of lines in the file ID information display area 46 (see the file ID information display area 46 in which "No. 2" is indicated. As shown in this example, the size of the file ID information display area 46 varies depending on the length of the file ID information. In accordance with the variation of the file ID information display area 46, the size of the arrangement section 42 varies (i.e., the length thereof in the Y direction varies).

According to the fourth embodiment, different from the third embodiment, when the file ID information display area 46 is expanded (i.e., if the file ID information is indicated in two or more lines), the arrangement section 42 next to the expanded arrangement section 42 in the Y-direction is a blank section. Thus, in FIG. 14, a portion 48 below the expanded arrangement section 42 (indicated as "No. 2"), no arrangement section 42 is provided. As a result, the arrangement section 42 below the arrangement section 42 in which "No. 3" is indicated shows the indication of "No. 5". As above, according to the fourth embodiment, the arrangement sections 42 in the same row are aligned, and a distance between two rows is stayed unchanged. In FIG. 14, the portion 48 and a portion 49 are blank portions since the arrangement sections 42 above these portions (i.e., "No. 2" and "No. 4" index images) are expanded as the file ID information is indicated in a plurality of lines.

FIG. 15 is a flowchart illustrating an index image printing process which is performed when the index image printing program 27 (see FIG. 13) is executed by the CPU 21. Specifically, the index image printing program is executed such that the program is retrieved from the ROM 23 and written in the RAM 24 when the user operates the operation unit ;6 and input a index image print command, under a condition where a storage such as the USB memory 32 is connected to the USB port 10. FIGS. 16-19 show exemplary data structures of the arrangement area information storing area 35 shown in FIG. 13.

When the index image printing process according to the fourth embodiment is started, the process initializes the arrangement area information stored in the buffer area 29 in S81. The. arrangement area information is managed using a table shown in FIG. 16.

In the table shown in FIG. 16, arrangement flag areas 51-62 are provided for each arrangement section number. The "arrangement section number" is a number assigned to each arrangement section 42 provide in the arrangement area 41. According to the fourth embodiment, there are 12 (twelve) arrangement sections 42 (four rows, three arrangement sections 42 for each row) in a matrix. To the arrangement sections 42, from the left to right, top to bottom, the arrangement section numbers "1" to "12" are assigned. Each arrangement flag shows one of three states: no index image or file ID information is allocated in the arrangement section 42 (flag=0); an index image and file ID information have been allocated in the arrangement section 42 (flag=1); and an index image or file ID information cannot be allocated to the arrangement section 42 (flag=2). When the arrangement area information is initialized, "0" (i.e., no data is allocated) is set to each of the arrangement flag areas 51-62. It should be noted that, in the arrangement areas having the numbers 10, 11 and 12, the file ID information which should be indicated in a plurality of lines (i.e., having more than 24 letters) cannot be allocated.

In S82, the process retrieves all the files stored in the USB memory 32 connected to the USB port 10, and stores the retrieved files in the file storage area 32 (see FIG. 13). In S83, the process obtains index image data and file information from each of the files stored in the file storage area 32. Then, in S84, the process obtains the arrangement area information from the buffer area 29. At this stage, the obtained arrangement area information is initialized information.

In S85, the process searches the information obtained in S84 to identify a first one of the arrangement sections 42 for which the arrangement flag has not been referred to. Then, the process judges whether the arrangement flag of the identified arrangement section 42 is "0". For example, when the arrangement area information has been initialized, the first arrangement section 42 that does not refer to the arrangement flag is the arrangement section 42 corresponding to the arrangement section number "1" in FIG. 16. Thus, the process refers to the arrangement flag area 51 (FIG. 16) to check the value of the arrangement flag.

Immediately after the initialization of the arrangement area information has been performed, the arrangement flag corresponding to the arrangement section number "1" is "0" (S85: YES). Therefore, the process retrieves the index image data and file information from the file storage area 32, and allocate the same to the arrangement section 42 corresponding to the arrangement section number "1". Specifically, the process allocates: the index image data representing the contents of the file to the index image data arrangement area 43 of the arrangement section 42; the file ID information included in the file information to the file ID information display area 46; update information included in the file information to the update information display area 47; and the serial number assigned to the file to the serial number display area 45.

In S87, the process updates the arrangement area information. When the data has been allocated in the arrangement section 42 corresponding to the arrangement section number "1" as described above, the flag "1" is set to the arrangement flag area 51 corresponding to the arrangement section number "1", and the arrangement area information is rewritten. Therefore, the process updates the arrangement area information to ensure that the arrangement area information reflects the update. Further, the process stores the index image data, file ID information, update information and serial number in the buffer area 29 corresponding to the area section number "1".

In S88, the process confirms whether the arrangement flag "1" or "2" (but not "0") is set to each of the arrangement flag areas 51-62 referring to the arrangement are information stored in buffer area 29 (i.e., the process confirms that the files are allocates to all the arrangement areas 42).

At this stage, in the arrangement area information in the buffer area 29, the arrangement flag "0" is set to each of the arrangement flag area 52-62 for the arrangement section number "1", and no index image data or file ID information has bee allocated to the arrangement sections 42 corresponding to the arrangement section numbers 2-12 (S88: NO). Thus, in S89, the process judges whether there remains a retrievable file in the file storing area 32. According to the fourth embodiment, when a file is retrieved from the file storing area 28 so as to be allocated to an arrangement section 42, the file is deleted from the file storing area 28. Therefore, only files which have not yet been allocated to the arrangement sections 42 remain in the file storing area 32.

If there remains no retrievable file in the file storing area 32 (S89: NO), the process prints out the data stored in the buffer area 29 corresponding to the arrangement area 42 on the printing sheet 3 (S90), and is terminated.

If there remains a retrievable file in the file storing area 32 (S89: YES), the process returns to S82. Then, the process retrieves a next file from the file storing area 32 (S82), and obtains the index image data and the file information from the retrieved data (S83). In S84, the process obtains the arrangement area information from the buffer area 29. At this stage, the arrangement area information as shown in FIG. 17 is obtained.

In S85 of FIG. 15, the process searches for the arrangement area information obtained in S84 (i.e., shown in FIG. 17), and identifies the arrangement section 42 corresponding to the arrangement area number "2" as the first arrangement area 42 to which the index image data has not been allocated, referring to the arrangement flag. Then, the process checks the arrangement flag of the arrangement flag area 52 that corresponds to the arrangement area number "2". Since the arrangement flag of the arrangement flag area 52 is "0" (S85: YES), the process stores the index image data and file information obtained in S83 in the buffer area 29 corresponding to the arrangement section 42 which corresponds to the arrangement section number "2".

Next, in S87, the process sets the arrangement flag "1" to the arrangement flag area 52 corresponding to the arrangement section number "2" as shown in FIG. 18. At this stage, as shown in FIG. 14, if the file ID information allocated to the arrangement section 42 corresponding to the arrangement section number "2" exceeds 24 letters, the file ID information is indicated in the file ID information display area 46 in a plurality of lines. As a result, the area of the arrangement section 42 corresponding to the arrangement section number "2" becomes larger than its initial setting, and overlaps the arrangement section 42 for the arrangement section number "5". Then, it becomes impossible to allocate the data to the arrangement section 42 corresponding to the arrangement section number "5". Accordingly, in such a case, as shown in FIG. 18, the arrangement flag "2" is set to the arrangement flag area 55 corresponding to the arrangement section number "5". The arrangement area information is rewritten as above, and then updated.

In S88, the process judges whether the files are allocated to all the arrangement sections 42. If there remains the arrangement sections 42 to which files are not allocated (S88: NO), and if there remains a retrievable file in the file storing area 32 (S89: YES), the process returns to S82 and above-described steps are executed to process the retrievable file remained in the file storing area 32. By repeating the above steps, to the arrangement sections 42 corresponding to the arrangement section numbers 3 and 4, the index image data and the file information are allocated.

The process proceeds and when the arrangement area information is obtained to check the arrangement flag for the arrangement number "5", the arrangement flag "2" has been set to the arrangement flag area 55 for the arrangement section number "5". In this case, since the arrangement flag is not "0" (S85: NO), the process refers to the arrangement flag for the next arrangement section number (i.e., "6") in S91, and returns to S85.

Since the arrangement flag for the arrangement section "6" obtained in S91 is "0" (S85: YES), the process allocates the index image data and the file information obtained in S83 to the arrangement section 42 corresponding to the arrangement section "6". That is, as shown in FIG. 14, the arrangement section 42 corresponding to the arrangement area number "5" is set as the blank portion 46, and the image data and file information (i.e., the serial number, file ID information and update information) are allocated to the arrangement section 42 on the right-hand side of the blank portion 48.

Repeating the above steps, if the process confirms in S88 that the arrangement flag "1" or "2" has been set to all the arrangement flag areas 51-62 as shown in FIG. 19, the process determines that files are allocated to all the arrangement sections 42 (S88: YES). In this case, in S92 of FIG. 15, the process prints out the index image data and the file information (i.e., serial number, file ID information and update information) stored in the buffer area 29 on the printing sheet 3. Then, in S93 (which is similar to S89), the process judges whether there remains a retrievable file in the file storing area 32.

According to the fourth embodiment, to the arrangement sections 42 corresponding to the arrangement section numbers 10-12, the file ID information that includes 24 letters or less can only be allocated. Therefore, if the file ID information corresponding to the arrangement section number 10 has more than 24 letters, the process judges that the files have been allocated to all the arrangement sections 42, and the index image data and the file information that were supposed to be allocated to the arrangement section 42 corresponding to the arrangement section number 10 is printed on the next printing sheet. The data for the arrangement sections 42 corresponding to the arrangement section numbers 11 and 12 is treated similarly.

If there remains a retrievable file in the file storing area 32 (S93:YES), the process initializes the arrangement area information in S94. That is, as shown in FIG. 16, all the arrangement flags are set to "0". At the same time, the index image data and file information having been allocated to the arrangement sections 42 are cancelled. Then, the process returns to S82 and repeats the process for allocating the remaining files to the arrangement sections 42.

If there remains no retrievable file in the file storing area 32 (S93: NO), the process is terminated.

As described above, according to the fourth embodiment, if the file ID information is too long and cannot be indicated in one line (e.g., the central arrangement section of the first row in FIG. 14), the arrangement section 42 immediately below is made a blank portion, and the arrangement section 42 in which the file ID information is to be indicated is expanded downward. Then, the entire file ID information is indicated in a plurality of lines. With this configuration, as shown in FIG. 14, a distance between the rows are fixed and the file ID information can be printed legibly on the printing sheet 3.

According to the fourth embodiment, if the file ID information is longer than the predetermined length, the arrangement section located below is made as a blank portion and the arrangement section for the file ID information is expanded downward. The invention can be modified such that, instead of expanding the arrangement section downward, the file ID information longer than the predetermined length may be indicated to extend, regardless of the limitation of the number of letters for one line. In such a case, the arrangement section on the right side my be made as the blank portion to allow the indication of the file ID information.

According to the above-described embodiments, as an example of a recording medium, the USB memory 32 connected to the USB port 10 is described. This configuration is an exemplary one and can be modified such that any storage medium can be employed alternatively or optionally. The storage medium need not be ones connected through the USB port 10, but any type of medium which may be connected through a parallel communication port or serial communication port.

What is claimed is:

1. An image forming apparatus, comprising:
   a processor; and
   a memory storing computer-readable instructions therein, the computer-readable instructions, when executed by the processor, to cause the processor to:
   allocate, in a plurality of arrangement sections in a predetermined layout, a plurality of pieces of index image data respectively representing a plurality of files and a plurality of character strings respectively relating to the plurality of files, the plurality of arrangement sections being arranged in row and column directions in a matrix in the predetermined layout;
   modify the predetermined layout by expanding a first arrangement section, in which a particular character string is to be allocated, in the column direction when a length of the particular character string to be allocated is longer than a predetermined length,
   wherein the allocating comprises allocating the particular character string in a plurality of lines in the expanded first arrangement section; and
   print out the plurality of pieces of index image data and the character strings allocated in the modified predetermined layout.

2. The image forming apparatus according to claim 1, wherein, when the first arrangement section is expanded to modify the predetermined layout, a second arrangement section, which is next to the first arrangement section in the row direction, is also expanded in the column direction so that the expanded first arrangement section and the expanded second arrangement section are aligned in the row direction.

3. The image forming apparatus according to claim 1, wherein, when the first arrangement section is expanded to modify the predetermined layout, a position of a second arrangement section, which is next to the first arrangement section in the column direction, is changed in the column direction.

4. The image forming apparatus according to claim 3, wherein, when the first arrangement section is expanded to modify the predetermined layout, a position of a third arrangement section, which is next to the second arrangement section in the row direction, is also changed in the column direction so that the second arrangement section of which position has been changed and the third arrangement section of which position has been changed are aligned in the row direction.

5. The image forming apparatus according to claim 1, wherein the predetermined layout is modified by expanding the first arrangement section in the column direction without expanding the first arrangement section in the row direction.

6. The image forming apparatus according to claim 1, wherein,
   the first arrangement section includes a first area in which the index image data is allocated and a second area in which the particular character string is allocated, and
   the predetermined layout is modified by expanding the second area without expanding the first area.

7. The image forming apparatus according to claim 1, wherein the first arrangement section is expanded so that all characters included in the particular character string are allocated in the expanded first arrangement section.

8. The image forming apparatus according to claim 1, wherein,
   the memory stores the computer-readable instructions, when executed by the processor, to further cause the processor to sort the plurality of character strings based on a length of each character string, and
   the character strings are allocated in the plurality of arrangement sections based on a sorting order.

9. The image forming apparatus according to claim 1, wherein the allocating further comprises dividing the particular character string into the plurality of lines in the expanded first arrangement section.

10. The image forming apparatus according to claim 1, wherein the predetermined length is a maximum length of a character string to be allocated in one line in the first arrangement section in the row direction.

11. A non-transitory computer usable storage device having computer-readable instructions stored thereon that instruct a computer to execute an image forming process comprising the steps of:
    allocating, in a plurality of arrangement sections in a predetermined layout, a plurality of pieces of index image data respectively representing a plurality of files and a plurality of character strings respectively relating to the plurality of files, the plurality of arrangement sections being arranged in row and column directions in a matrix in the predetermined layout;
    modifying the predetermined layout by expanding a first arrangement section, in which a particular character string is to be allocated, in the column direction when a length of the particular character string to be allocated is longer than a predetermined length, wherein the allocating comprises allocating the particular character string in a plurality of lines in the expanded first arrangement section; and printing out the plurality of pieces of index image data and the character strings allocated in the modified predetermined layout.

\* \* \* \* \*